United States Patent [19]
Boyce

[11] Patent Number: 5,923,814
[45] Date of Patent: Jul. 13, 1999

[54] METHODS AND APPARATUS FOR PERFORMING VIDEO DATA REDUCTION OPERATIONS AND FOR CONCEALING THE VISUAL EFFECTS OF DATA REDUCTION OPERATIONS

[75] Inventor: Jill MacDonald Boyce, Manalapan, N.J.

[73] Assignee: Hitachi America, Ltd., Tarrytown, N.Y.

[21] Appl. No.: 08/917,789

[22] Filed: Aug. 15, 1997

Related U.S. Application Data

[63] Continuation of application No. 08/340,683, Nov. 16, 1994, Pat. No. 5,887,115, which is a continuation-in-part of application No. 08/228,949, Apr. 18, 1994, which is a continuation of application No. 08/004,158, Jan. 13, 1993, and a continuation-in-part of application No. 08/184,716, Jan. 21, 1994.

[51] Int. Cl.$^6$ .............................. H04N 5/917; H04N 7/26
[52] U.S. Cl. ........................................... 386/109; 386/112
[58] Field of Search ...................... 386/109, 111, 386/112, 33, 27, 46, 1, 68; 348/405, 414, 419, 422, 417, 418; H04N 5/917, 7/26

[56] References Cited

U.S. PATENT DOCUMENTS

| | | | |
|---|---|---|---|
| 5,377,051 | 12/1994 | Lane et al. ............................... | 360/33.1 |
| 5,444,575 | 8/1995 | Augenbraun et al. ..................... | 360/64 |
| 5,576,902 | 11/1996 | Lane et al. ................................. | 386/68 |
| 5,592,299 | 1/1997 | Boyce et al. .............................. | 386/68 |
| 5,614,952 | 3/1997 | Boyce et al. ............................. | 348/392 |
| 5,614,957 | 3/1997 | Boyce et al. ............................. | 348/567 |
| 5,623,344 | 4/1997 | Lane et al. ................................. | 386/81 |
| 5,635,985 | 6/1997 | Boyce et al. .............................. | 348/402 |
| 5,654,759 | 8/1997 | Augenbraun et al. .................. | 348/405 |
| 5,666,209 | 9/1997 | Abe ......................................... | 386/109 |
| 5,668,918 | 9/1997 | Augenbraun et al. .................. | 386/111 |
| 5,673,358 | 9/1997 | Boyce ..................................... | 386/112 |
| 5,684,539 | 11/1997 | Boyce et al. ............................ | 348/420 |
| 5,687,275 | 11/1997 | Lane et al. ................................ | 386/68 |
| 5,717,816 | 2/1998 | Boyce et al. ............................. | 386/111 |
| 5,729,648 | 3/1998 | Boyce et al. .............................. | 386/68 |
| 5,729,649 | 3/1998 | Lane et al. ................................ | 386/68 |

*Primary Examiner*—Robert Chevalier
*Attorney, Agent, or Firm*—Michaelson & Wallace; Peter L. Michaelson; Michael P. Straub

[57] ABSTRACT

Methods and apparatus for converting digital signals having a variable data rate to fixed data rate signals suitable for recording on a tape by a digital video tape recorder are disclosed. The methods include buffering of the received variable rate data, measuring the data rate of the received data for a fixed period of time and processing the buffered data to converted it into a fixed rate data stream. This processes is repeated for each of the fixed periods of time. Methods for increasing the recording time of a digital video tape recorder ("VTR") and for supporting multiple normal play modes of digital VTR operation, e.g., recording modes for recording SDTV and HDTV are also disclosed. To generate fixed data rate signals from variable data rate signals one or more of data padding and/or data reduction techniques are used. The same data reduction techniques used to generate the fixed rate data stream are used, in accordance with various embodiment of the invention, to reduce the amount of data required to represent a video frame.

5 Claims, 9 Drawing Sheets

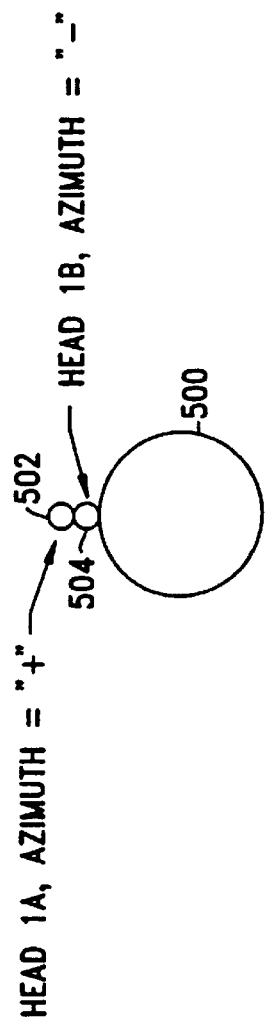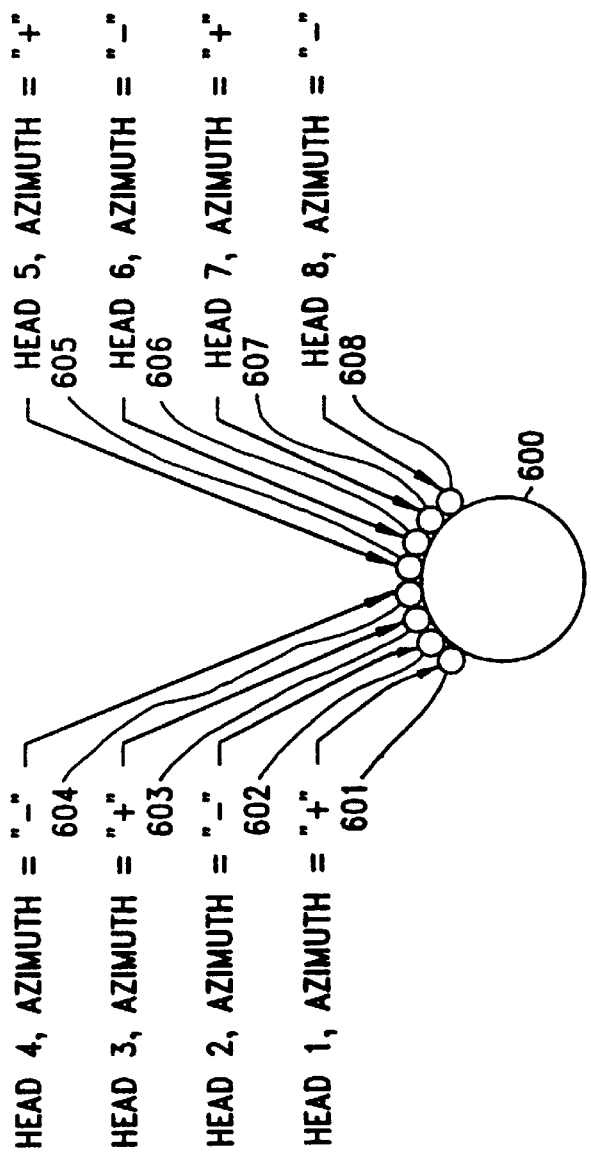

LP MODE (1/3X) RECORDING MODE EXAMPLE:

BLANK TAPE:

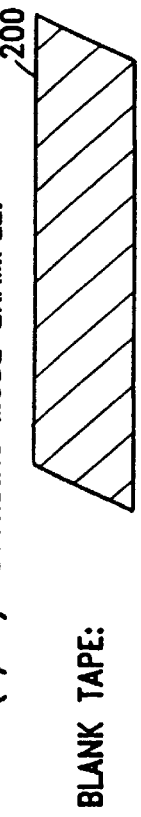

FIG. 5A

PATH OF FIRST HEAD: (RECORDED)

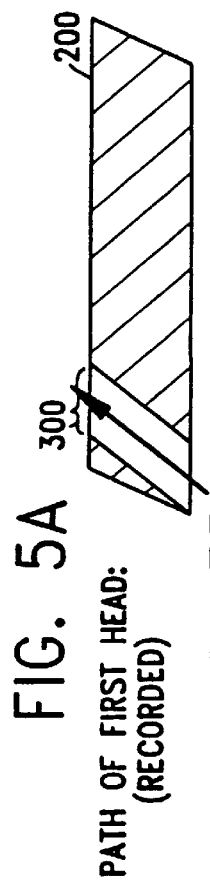

FIG. 5B

PATH OF SECOND HEAD: (NOT RECORDED)

LINEAR TAPE SPEED IS 1/3, CAUSING TRACK OVERLAP. THIS IS OK. BECAUSE NO DATA IS RECORDED ON THIS HEAD'S PASS.

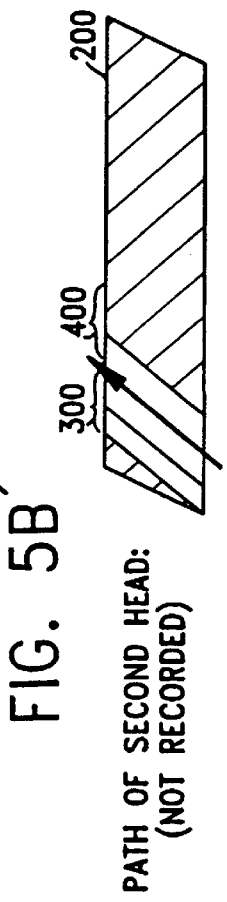

FIG. 5C

PATH OF THIRD HEAD: (NOT RECORDED)

OVERLAP AGAIN OCCURS, BUT THIS HEAD'S PASS IS ALSO NOT RECORDED

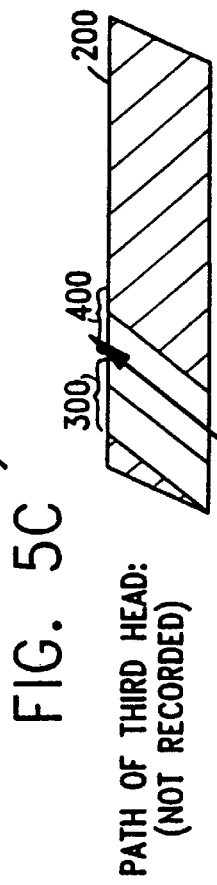

FIG. 5D

PATH OF FOURTH HEAD: (RECORDED)

NO OVERLAP, SO DATA IS RECORDED ON THIS HEAD'S PASS.

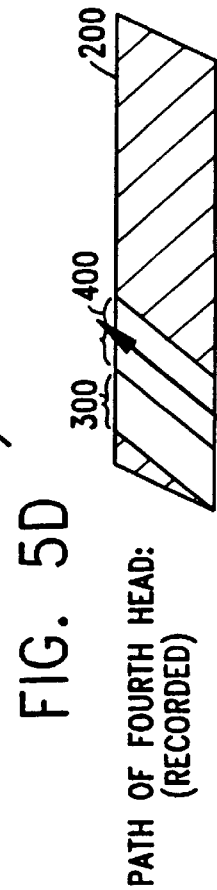

FIG. 5E

METHODS AND APPARATUS FOR PERFORMING VIDEO DATA REDUCTION OPERATIONS AND FOR CONCEALING THE VISUAL EFFECTS OF DATA REDUCTION OPERATIONS

RELATED APPLICATIONS

This application is a continuation of U.S. patent application Ser. No. 08/340,683, filed Nov. 16, 1994, now U.S. Pat. No. 5,887,115, which application is a continuation-in-part of pending U.S. patent application Ser. No. 08/228,949, filed on Apr. 18, 1994, which is a continuation of abandoned U.S. patent application Ser. No. 08/004,158, filed on Jan. 13, 1993, and a continuation-in-part of pending U.S. patent application Ser. No. 08/184,716, filed on Jan. 21, 1994, each of which is hereby expressly incorporated by reference.

FIELD OF THE INVENTION

The present invention is directed to digital video tape recorders ("VTRs"), and more particularly, to methods for recording digital high definition television ("HDTV") and/or digital standard definition television ("SDTV") signals on a tape.

BACKGROUND OF THE INVENTION

Digital VTR's can be expected to receive digital video data in a compressed format. Several formats have been proposed for compressing video data to form a digital video data stream which may then be displayed and/or recorded on video tape. For a discussion of several proposed digital video standards, see U.S. patent application Ser. No. 08/003,887 referred to above.

One digital video compression and data transmission format that offers particular promise with regard to high definition television ("HDTV") is the ISO-MPEG (International Standards Organization—Moving Picture Experts Group) standard described in a report titled "Coding of Moving Pictures and Associated Audio for Digital Storage Media up to about 1.5 Mbits/s", ISO 2 11172 rev 1, Jun. 10, 1992 hereby expressly incorporated by reference.

Terms used in this application are intended to be used in a manner that is consistent with the same terms used in the MPEG standard unless indicated otherwise. Thus, references to video pictures, I-pictures, P-pictures, B-pictures, video codewords, video codeword headers, slices, slice headers, macroblocks, macroblock headers, DCT (discrete cosine transform) coefficients and other terms used to refer to video data stream elements and compression techniques are intended to refer to such elements and techniques as defined by the MPEG standard. The use of such MPEG terminology is, however, in no way intended to limit the present application to the MPEG video data standard. Accordingly, references to MPEG data stream elements are intended to cover similar "MPEG like" data stream elements incorporated into video standards which use the same basic formats and data compression techniques described in the above referenced MPEG documents.

It is to be understood that various features of the present invention, such as data recording techniques, as opposed to, e.g., specific data prioritization and selection techniques, are generally not data format dependent and are therefore not limited to applications involving specific data formats.

While digital VTRs may have to be designed to work with one or more video compression schemes and/or data formats, the basic problems associated with increasing the recording time of a digital VTR are generally the same regardless of the format of the compressed digital video data being supplied to a VTR for recording and later playback.

Herein references to normal play modes of VTR operation are intended to refer to modes of digital VTR operation wherein data sufficient to reproduce a complete or almost complete set of the video pictures received by the VTR are recorded on, and/or read from, the video tape. Normal play modes of VTR operation are to be contrasted with trick play modes of VTR operation such as fast forward and reverse operation where only a small portion of the video data received and recorded on a tape are read and displayed during such trick play operation.

Analog video tape recorders that are capable of supporting multiple normal play modes of VTR operation are well known. For example, VHS VCR's generally support long play "LP" mode, and extended play "EP" mode in addition to the standard play "SP" mode of operation. In each of the three modes of operation, the same fixed length of tape is used to store a different number of video images, e.g., a sufficient number of images to display 2, 4, or 6 hours of National Television Systems Committee ("NTSC") analog video data. Each of these three different normal play modes of operation provide differing image quality.

The different normal play modes supported by VHS VCRs are achieved by using different tape speeds for each normal play mode of VHS VCR operation resulting in different data densities on the tape for each normal play mode. This permits the video data rate and the tape output data rate to remain unchanged in the different modes of operation. While the video data rate remains the same for all modes of VHS operation, as the tape data density is increased to support the longer play modes of operation, the signal to noise ratio ("S/N") is decreased resulting in a corresponding decrease in image quality during VHS playback operation.

Digital video tape recorders, including those that might be used to record HDTV will generally be required to operate in the highest tape data density mode possible in order to store the large amounts of digital data needed to represent video images. Thus, any attempt to increase data density on a digital video tape beyond the normal data density will result in an unacceptable digital error rate. Such a high error-rate is due to the decrease in the S/N ratio which results from the use of the higher than normal tape data density. In a digital VTR the increased digital error rate that results from the use of higher than normal tape data density rates, is likely to lead to a catastrophic loss of picture. Accordingly, varying the tape data density in a digital VTR does not provide a viable means of supporting multiple normal play recording and video tape recorder playback speeds, i.e., modes of digital VTR operation, as it does in analog VCRs.

The use of data reduction techniques to reduce the amount of data required to represent a series of images might appear to be the only thing necessary for increasing digital VTR recording time. However, the mere reduction, e.g., through the use of data compression or other techniques, in the data rate required to create a series of video images, in and of itself, is insufficient to achieve a long-play mode of operation in a digital VTR. Generally, because of the difficulty of manufacturing a headwheel assembly that can be used to record video data at more than one rotational speed, known digital VTR's only support the recording of a data bit stream at a single constant data density. Because HDTV and other video formats require that a fixed number of video images be displayed during a time period of a predetermined duration, a reduction in the data rate requires that less data be recorded and later read back per a given unit of time than would be required if the data were recorded and read back at the full bit stream data rate. Thus, a digital VTR which implements a long-play mode through a reduction in the data rate is required to implement one bit stream recording and playback data rate for standard play operation and another bit stream recording and playback data rate for long-play mode operation.

Known digital VTRs are capable of recording data comprising bit streams only at a single constant data rate. Accordingly, because known digital VTR's are incapable of recording multiple-speed bit streams at a constant data density, which would be required to support a standard play and a long play mode of operation in a digital VTR, known VTRs can not support a long play mode of operation implemented using data reduction techniques alone.

While some known data logging devices based on linear scan, as opposed to helical scan, recording methods support the recording of multiple-speed bit streams, such data logging devices are impractical for use as digital VTRs. This is because linear scan data recording devices capable of high data rates generally use a large number of heads which make such recording devices too costly for use as consumer digital VTRs.

Accordingly, there is a need for a digital VTR that can support at least one long play mode of operation in addition to standard play operation. In addition, in order to maintain compatibility with standard HDTV receivers during long play mode operation, the digital VTR should generate a data stream that is compliant with the video data compression standards and data stream format used during standard play mode. Furthermore, it is highly desirable that the digital VTR be capable of being implemented in a manner that makes it practical as a consumer digital VTR.

The use of digital SDTV which will have approximately the same resolution as current NTSC television has been suggested as a method of digital television communication in addition to the various proposed digital HDTV schemes.

In the case of digital SDTV, the SDTV signal can be broadcast using a fraction of the bandwidth used to transmit a HDTV signal. Accordingly, it is possible to transmit multiple, e.g., four, SDTV signals in the same channel that could otherwise accommodate a single HDTV signal. By dividing the available TV signal spectrum into a plurality of channels having a bandwidth equal to the bandwidth of a HDTV signal, it will be possible for a broadcaster to broadcast either a single HDTV signal or multiple digital SDTV signals within a single channel. For example, a HDTV signal may be broadcast at night while multiple SDTV signals are broadcast in the same channel at other times of the day.

While most proposals for HDTV signals have suggested use of a fixed rate HDTV signal for broadcast purposes, e.g., having a bandwidth corresponding to the maximum bandwidth permitted by the size of allocated channels, it has been suggested that SDTV signals be allowed to vary in terms of their data rate. In such a case, a transmitter allocated a single channel in which multiple SDTV signals can be broadcast would be able to instantaneously vary the bit rate for any one of the multiple SDTV signals being broadcast. In this manner, a transmitter may provide for an increased bit rate for one of the SDTV signals being broadcast within a channel at the expense of the other SDTV signals being broadcast within the same channel.

In such a case, the maximum bit rate possible for any SDTV signal would be the full channel bandwidth but since the use of the full bandwidth would result in the exclusion of other SDTV signals from the channel bandwidth it is likely that a maximum permissible data rate will be set either by the industry or the Federal Communications Commission for the transmission of SDTV signals. One likely maximum data rate is the data rate specified by the MPEG main profile at main level description which specifies a maximum data rate of 15 MBits/s which is less than the expected 19.3 Mbits/s data payload of a HDTV broadcast channel. Such a maximum data rate limitation will also serve to place reasonable limits on the size of the buffers that will be required to implement a SDTV receiver.

Because digital video tape recorders are generally designed to record at fixed rates there is a need for a method and apparatus for implementing a digital video tape recorder capable of recording and reproducing SDTV video signals which may have variable transmission data rates.

In addition, it is highly desirable that a VTR be capable of recording both HDTV signals as well as SDTV signals. Accordingly, there is a need for a digital VTR that is capable of recording at two different data rates, e.g., at a first data rate required to record a HDTV signal and at a second data rate suitable for recording SDTV signals. Furthermore, it is desirable that such VTRs also be capable of supporting one or more long play modes of VTR operation.

SUMMARY OF THE INVENTION

The present invention is directed to a method and apparatus for permitting a digital VTR to record HDTV signals and/or SDTV signals where the SDTV signals may have variable transmission data rates. The present invention is also directed to methods and apparatus for providing one or more long play modes of VTR operation.

In accordance with the present invention, recording of SDTV signals is achieved by performing data reduction and/or data rate smoothing techniques, in accordance with the present invention, on the variable rate data representing a SDTV signal.

By applying the data reduction and/or data rate smoothing techniques of the present invention, a SDTV signal is converted from a variable rate signal, into a fixed rate signal, which can then be recorded on a tape in accordance with one or more of the various recording methods of the present invention.

In order to support recording of both HDTV signals and SDTV signals, a VTR mode control circuit is used to detect whether HDTV or SDTV signals are being received. This is accomplished by, e.g., checking a received signal for a sequence header identifying picture size or a level indicator value indicative of either HDTV or SDTV or by measuring the data rate of the received signal to determine if it approximates a HDTV or SDTV data rate. If HDTV signals are being received the video recorder of the present invention is controlled to record the data at the rate of the HDTV signal. However, if the VTR mode control circuit detects that a SDTV signal is being received or if the VTR is instructed, e.g., via an input signal from a user, to operate in SDTV mode, data reduction and/or smoothing techniques are used to convert the variable rate SDTV signal into a fixed rate signal which is then recorded on a tape.

The digital VTR of the present invention records data at two or more different rates. For example, in one embodiment it records HDTV signals at one data rate while recording SDTV signals at a lower data rate.

In order to support long play modes of VTR operation, in one embodiment, multiple recording data rates are supported for recording HDTV signals and/or SDTV signals in accordance with the present invention.

BRIEF DESCRIPTION OF THE DRAWINGS

FIG. 3 is a representative diagram of a VTR head assembly comprising two heads of different azimuths arranged as a set of co-located heads.

FIG. 4 is a representative diagram of a VTR head assembly comprising eight heads, four of positive azimuth and four of negative azimuth.

FIGS. 5a through 5e are diagrams illustrating the path the heads of FIG. 1 trace over a tape in accordance with one long play mode embodiment of the present invention.

DETAILED DESCRIPTION

Figure 1:
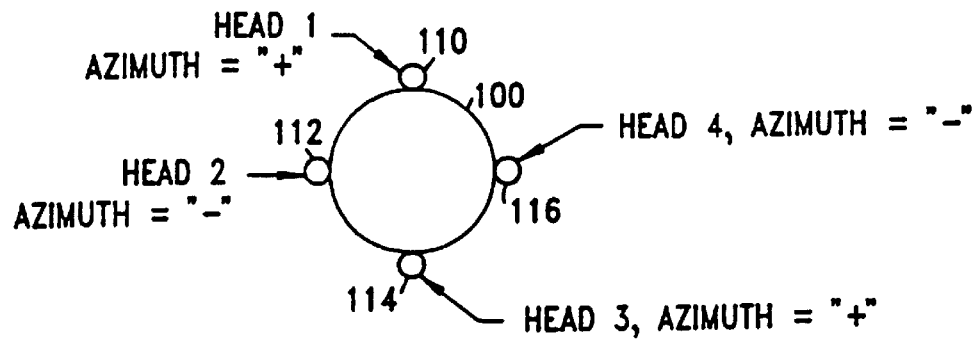
FIG. 1 is a representative diagram of a VTR head assembly comprising four heads, two heads being of positive azimuth and two heads being of negative azimuth.

The present invention is directed to digital video tape recorders ("VTRs") and, more particularly, to a method of increasing the recording time of digital VTRs by permitting a digital VTR to support multiple normal play modes of VTR operation, e.g., a standard play mode of operation and one or more long play modes of VTR operation. As will be discussed below, the digital VTR of the present invention maintains the same tape data density regardless of the particular normal play mode of VTR operation and produces a data stream that is in full compliance with the data compression standards and video format of the full rate bit stream generated during standard play mode operation.

Herein long play mode will be used to generally refer to a digital VTR mode of operation wherein a fixed length of video tape is used to store data representing more video images or pictures than are stored on the same length of tape during standard play mode operation. Stated another way, during standard play mode, a fixed length of tape may store video data sufficient to produce, e.g., 2 hours of HDTV images while during long play mode the same fixed length of tape may be used to store, e.g., data representing 4 hours of HDTV images.

While the references to data in this application generally refer to video data, the data may also include audio data and/or other associated data.

The data stream received by a VTR from, e.g., a transmitter or cable television source, is normally of a fixed bit rate which is a function of the particular data transmission format. The data stream received by the VTR of the present invention and output during standard mode VTR operation, will be referred to as a full rate data stream or a bit stream. Data streams generated by the VTR of the present invention having a data rate that is less than the data rate of the full rate bit stream will be referred to as reduced rate data streams or reduced rate bit streams. During digital VTR long play mode operation such data streams may be generated, e.g., by applying data reduction techniques to the full rate bit stream received by the digital VTR.

Generally, long play mode recording in accordance with the present invention involves three steps 1) reducing the amount of data that must be recorded on a tape to represent a series of images, e.g., video pictures by generating a reduced rate bit stream from the received full rate bit stream, 2) recording the data in the reduced rate bit stream on a tape at the same data density that data are recorded at during the standard play mode of VTR operation when the full rate bit stream is recorded on the tape, and 3) reading a previously recorded tape at a reduced data rate.

Thus, in accordance with the present invention, VTR recording during long play mode is achieved by first reducing the amount of data needed to represent images or pictures to produce a reduced rate bit stream from the full rate bit stream received by the digital VTR. During long play mode recording is then performed by recording the reduced rate bit stream on a tape at the tape's normal data density in accordance with the methods of the present invention. Finally, data are read from the tape at a reduced rate in accordance with the methods of this invention. As discussed above, in the case of digital VTRs, the tape's normal data density will generally approximate the tape's maximum data density. In this manner,-the present invention achieves long play modes of operation without having to increase data density as is commonly done in analog VCR applications.

The present invention provides three data reduction methods that may be used either alone or in combination to reduce the amount of data needed to represent a series of images during long play modes of VTR operation. In addition, the present invention provides various methods for recording and playing back the reduced set of digital data needed to represent a series of images on a video tape, at the same data density as used when recording video-data during standard play mode of VTR operation. These recording methods permit the headwheel upon which the video heads are mounted to rotate at the same rate when recording either a full rate bit stream or a reduced rate bit stream. The data reduction methods of the present invention will now be described in detail.

Three data reduction techniques of the present invention which are discussed below, are designed to be used with the full rate compressed video bit stream that a digital VTR will normally receive. The full rate compressed video that a VTR receives will contain data representing a series of video pictures. The video pictures may be grouped into sequences. Each sequence of pictures may contain, e.g., one fully intracoded video picture and one or more inter-coded video pictures. Each inter-coded video picture may be either a predictively or bi-directionally coded video picture. The intra-coded video picture in each sequence of pictures normally serves as an anchor frame for other inter-coded video pictures within the sequence of pictures.

It is expected that each video picture to be represented as compressed digital video data will be divided into a number of segments for encoding purposes. In accordance with such encoding schemes, the data representing each segment of a video picture correspond to a particular portion of a video display screen. For example, one segment may represent a portion of a video picture intended to be displayed near the center of a video display screen while another segment may represent a portion of a video picture intended to be displayed near the outside edge of a video display screen.

Accordingly, a video data stream, i.e., bit stream, received by a digital VTR is likely to include data representing multiple sequences of pictures wherein each sequence of pictures includes data representing a series of video pictures. The data representing each video picture may comprise data representing segments of the video picture, e.g., macroblocks, with each macroblock corresponding to a different physical screen position. Macroblocks that represent a video picture may be further grouped together for encoding purposes into, e.g., slices.

In addition to the encoded video data, the video data stream may include e.g., headers identifying the data representing each video picture, as well as headers identifying slices and macroblocks which comprise each video picture.

The video data and header information comprising a video data stream may be variable length encoded into, e.g., codewords. The codewords may be further arranged into data packets. The data packets and/or codewords may contain additional headers identifying the contents of the individual data packets or codewords contained therein. The data packets which are further arranged to form a digital video data stream may be received by a digital VTR of the present invention.

Accordingly, the digital video data stream received by a digital VTR is likely to include variable length encoded, compressed video data, arranged as a series of groups of pictures with the data comprising each group of pictures being encoded on a picture by picture basis.

As discussed above, in accordance with the present invention, the amount of data recorded on a tape must be reduced to achieve longer recording times, i.e., long play modes of VTR operation.

One method of achieving the reduced data rate needed for long play VTR operation is to fully decode the compressed video data comprising the full rate video data bit stream received by the digital VTR and then to do a full encode of the decoded video data at the desired bit rate. While this method would provide the required reduction in video data, such an approach is cost prohibitive because of the excessive amounts of hardware required to implement such a decoder and encoder in a digital VTR.

The present invention provides three alternative means of reducing the amount of video data that must be recorded to achieve digital VTR long play modes of operation. These methods of generating a reduced rate bit stream require less hardware, and are therefore generally cheaper to implement than the above method of fully decoding and re-encoding the data in the full rate bit stream.

In accordance with each of the following data reduction techniques, the data in the full rate data stream received by a digital VTR is first variable length decoded before the data reduction methods of the present invention are applied. After a reduced rate data stream is generated from the variable length decoded full rate data stream, it is re-encoded to generate a variable length encoded reduced rate bit stream.

In accordance with the first of the three data reduction techniques of the present invention, selected parts of the full bit-rate compressed video bit stream are extracted and packed to form a new reduced bit-rate bit stream that remains compliant with the encoding and bit stream data format supported by the digital VTR of the present invention.

In accordance with this method, the bit rate of a full rate bit stream can be reduced to a target bit rate by first prioritizing each codeword in the bit stream, and then selecting the codewords to form a new reduced rate bit stream having the desired data rate.

This approach takes advantage of the fact that, regardless of the particular encoding method used to generate the full rate bit stream, some codewords in the bit stream will contain data that are of relatively little importance. Such codewords may be omitted from the bit stream without having a significant impact on picture quality. On the other hand, other codewords will contain relatively important data without which it might not be possible to generate a recognizable image.

In accordance with this codeword prioritization approach, each codeword in the full rate data bit stream received by the VTR is assigned a priority level or number based on its relative importance to generating a video frame having good image quality. Accordingly, codewords are prioritized as a function of their importance in generating video frames during long play modes of VTR playback operation.

The prioritization scheme used to support long play modes of VTR operation are likely to be similar to those used for trick play prioritization described in U.S. patent application Ser. No. 08/003,887, titled "DIGITAL VIDEO RECORDING DEVICE". Accordingly, a digital VTR that contains hardware for trick play prioritization such as the one in the above identified copending patent application, could implement a long play prioritization scheme according to the present invention at little or no additional cost.

One suitable prioritization scheme for prioritizing video codewords for use in a reduced rate bit stream suitable for supporting long play mode digital VTR operation is described below with regard to an MPEG based data stream. Listed below are the types of data that may be contained in a codeword, and the suggested priority number to be assigned to the codeword containing the data. It should be noted that the data in each codeword correspond to, or is associated with, a particular video frame represented by the data in the video data stream.

One suitable prioritization order for long play mode VTR operation, listed in order from the most important to the least important data, is as follows:

1. Video codeword headers that contain sequence and picture information, and slice headers that contain information on which position of the screen the corresponding slice data represents.
2. Macroblock headers which contain information about either a macroblock's position within a slice, quantization information and/or the method used to code macroblocks corresponding to the macroblock headers.
3. DC coefficients of Intra-coded video pictures (I-pictures).
4. Motion vectors for predictively coded video pictures (P- pictures).
5. DC coefficients of the discrete cosine transform ("DCT") for P- pictures which correct the corresponding P- picture and improve the P- picture's image quality.
6. Motion vectors for bi-directionally coded video pictures (B- pictures), that provide enough information to predict a picture from the last I- picture or P- picture.
7. DC coefficients of the DCT for B-pictures which correct the corresponding B- pictures thereby improving the quality of the image generated therefrom.

8. Higher order DCT coefficients for I- pictures that can be used to improve the quality of the corresponding I-pictures and the P- and B- pictures which use the I-pictures as anchor frames.
9. Higher order DCT coefficients for P- pictures that can be used to further improve the quality of the corresponding P-pictures.
10. Higher order DCT coefficients for B- pictures that can be use to improve the quality of the corresponding B-pictures.

While the goal of the above prioritization scheme is to provide a method by which the data rate can be reduced, it is important to note that the reduced rate data stream generated during VTR long play mode operation should include sufficient data to support the same frame display rate supported during standard play mode.

Accordingly, unlike the case of selecting data to be displayed during trick play operation, the data reduction technique of the present invention is designed to reduce the amount of data needed to generate video pictures without decreasing the number of video pictures to be displayed. Thus, the data reduction methods of the present invention provide a method of reducing the data rate without altering the frame display rate.

Thus, while the above prioritization scheme is similar to that suggested for trick play prioritization, the reduced rate data stream generated for long play mode operation should include B-picture data that are of little or no use during trick play operation. Such B-pictures are normally not displayed during trick play operation and the data needed to generate such B-pictures are therefore normally omitted from a trick play data stream.

In order to achieve the desired reduction in the data rate, after prioritizing the codewords, the codewords having the highest priority from each sequence of pictures or video picture, are selected to-provide a reduced data rate bit stream having the desired data rate, e.g., for long play mode operation. For example, if a 25% reduction in the full bit stream data rate was desired for long play mode operation to provide a corresponding 25% increase in recording time, the highest priority codewords from each group of pictures or video pictures could be selected from the prioritized full rate data stream to create a reduced rate bit stream having a data rate of 75% that of the data rate of the full rate bit stream.

Such a data reduction approach can be used to achieve virtually any desired reduction in the data rate assuming sufficient data remains in the reduced rate bit stream to generate recognizable video images during long play mode VTR operation.

In accordance with one embodiment of the present invention, the data rate reduction needed to support long play modes of digital VTR operation is achieved merely by reducing the amount of higher order I-, P- and B- DCT coefficient data required to achieve the desired amount of data reduction. Higher order I-, P- and B- DCT coefficients include DCT coefficients other than the DC (zero frequency) coefficients.

In such an embodiment, it is desirable to maintain the same relative amounts of higher order I-, P- and B- DCT coefficients in the reduced rate bit stream as found in the full rate bit stream. Accordingly, the relative amounts of data represented by the codewords which are assigned to priority levels 8, 9 and 10, in accordance with the prioritization scheme of the present invention, should be selected for inclusion in the reduced rate bit stream in approximately the same ratios found in the full rate bit stream received by the digital VTR.

By maintaining the same relative amounts of higher order I-, P- and B- DCT coefficients in the reduced rate bit stream, as found in the full rate bit stream, dramatic changes in image quality between successive I-, P- and B- pictures will be avoided. In this manner, a viewer watching a series of images generated from a reduced rate data stream will not be confronted with sudden noticeable changes in image quality as the various I-, P- and B- video pictures are displayed.

While the above prioritization scheme is described using MPEG terminology, it should be noted that the prioritization scheme can be readily generalized to numerous other digital video compression systems.

The second data reduction method of the present invention, relies on changing the quantization scale factor used to generate the full rate bit stream to generate a reduced rate bit stream.

Normally when a bit stream is encoded, the quantization scale factor is dynamically adjusted to maintain the average data rate at the broadcast bit rate. The use of higher quantization scale factors results in the exclusion of higher frequency DCT coefficients from the data stream. The exclusion of such high frequency DCT coefficients has the result of reducing the quality of the images that can be reproduced from the data contained in the video data stream. However, a higher quantization scale factor does offer the advantage of reducing the amount of data that is included in the video data stream.

In accordance with the second data reduction method of the present invention, the data rate is reduced by increasing the quantization scale factor from that used during encoding of the broadcast bit stream received by the VTR.

In order to change the quantization scale factor to achieve the desired reduction in the data rate from the data rate of the full rate bit stream, the full rate bit stream is first variable length decoded. The decoded bit stream is then parsed to identify the DCT coefficients contained within the received portion of the data stream. The identified DCT coefficients are then requantized using a higher scale factor than that used to generate the full rate bit stream. The decoded and requantized bit stream is then variable length encoded again to form a reduced rate bit stream that is compliant with the format of the full rate bit stream.

It should be noted that in accordance with this method, the relative increase in the quantization scale factor need not be fixed at the same value for all DCT coefficients, macroblocks or pictures.

Figure 6A:
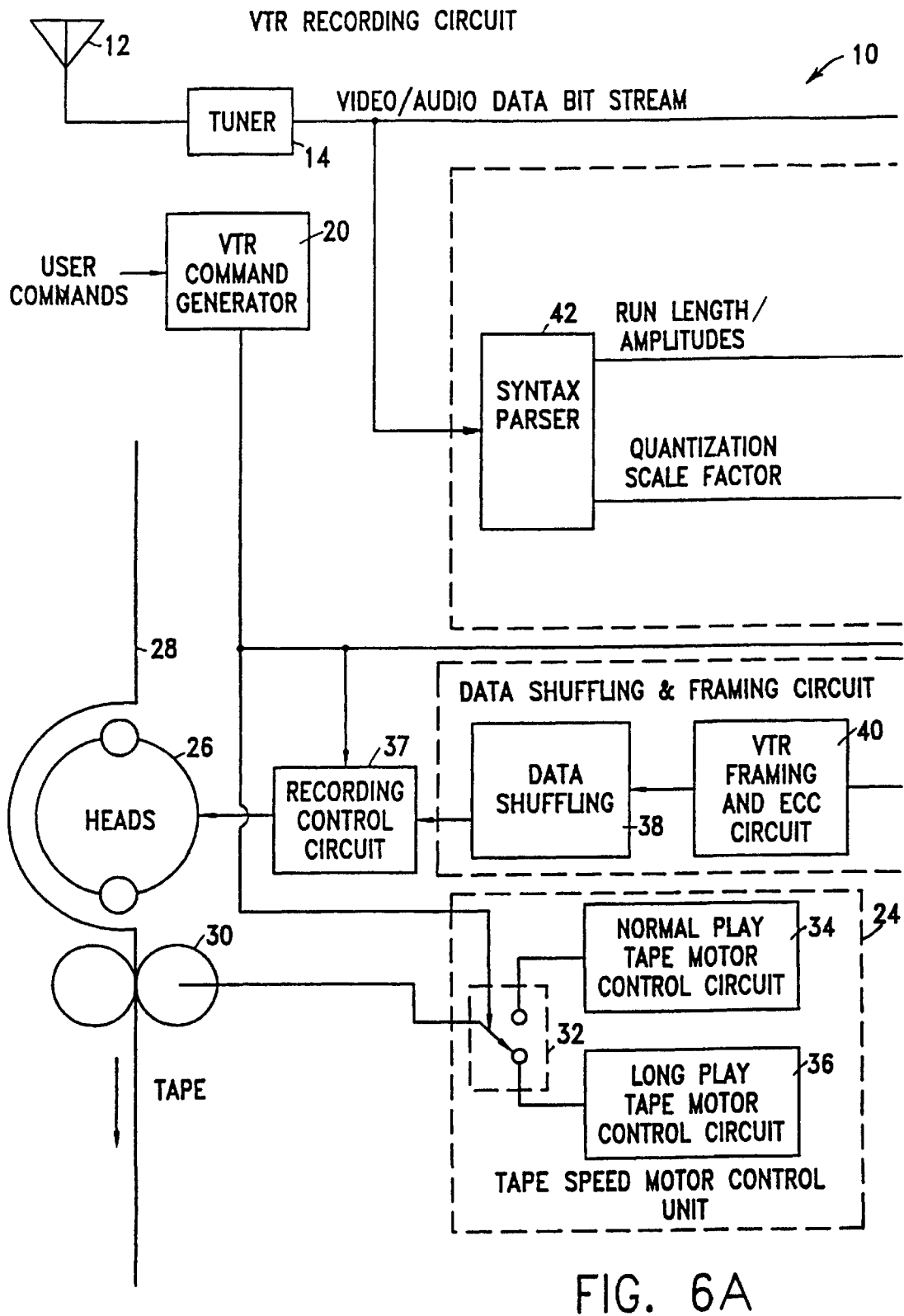
FIG. 6 is an exemplary schematic block diagram of a VTR recording circuit of the present invention.
Figure 6B:
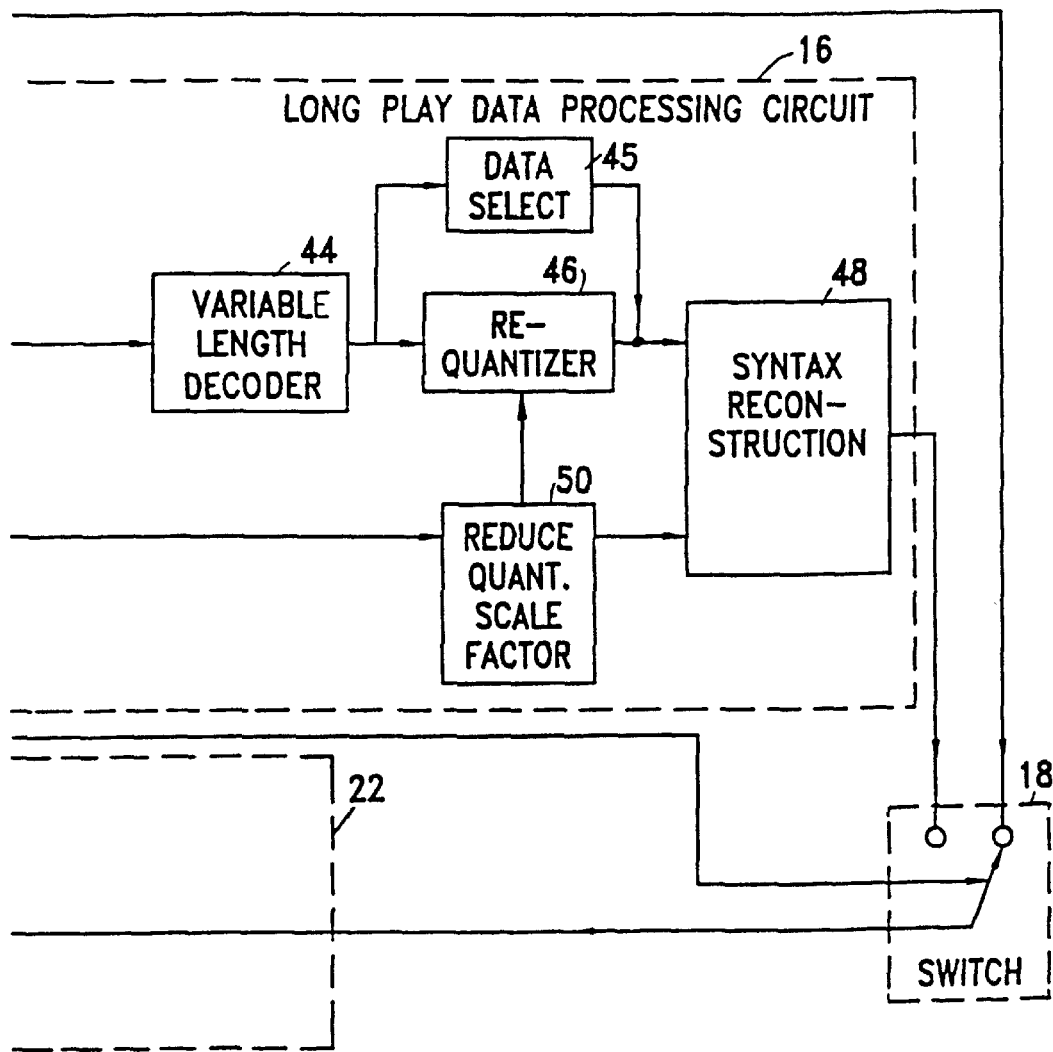

As will be discussed below, the VTR recorder circuitry illustrated in FIG. 6 is capable of performing such a requantization process in accordance with the data reduction method of the present invention.

Simulations have shown that requantizing with a higher quantization factor gives better results than data reduction through the use of data prioritization, when the two methods are used to achieve the same total data rate reduction. However, data prioritization is a simpler operation to implement than requantization. Accordingly, it may be cheaper to implement a long play mode in a digital VTR using data prioritization and selection rather than requantization to achieve the desired reduction in the data rate. However, the use of requantization provides superior results in terms of image quality.

The third method of generating a reduced rate bit stream from a full rate bit stream received by a VTR will now be described.

In the previously described methods, the bit rate was reduced by either 1) performing variable length decoding, data prioritization, selection of the prioritized data and re-encoding of the selected data or 2) performing variable length decoding, re-quantizing of the decoded data with an adjusted quantization scale factor selected to produce a reduced bit rate, and re-encoding of the re-quantized data. In accordance with each of these methods data reduction is performed uniformly over each video picture. Accordingly, data reduction is performed without taking into consideration the screen location of the image portion to be produced by the data upon which data reduction is being performed.

As discussed above, data within the bit stream received by the VTR represents a series of video pictures with portions of each video picture being represented by data contained within the bit stream. Each portion of a video picture corresponds to a particular screen location, for example, the center of the screen or the lower outside right hand portion of the screen. In the case of MPEG based broadcast systems each video picture is divided into many macroblocks which are individually encoded. Thus, each macroblock in the bit stream corresponds to a particular picture and a particular position within that picture.

In accordance with the third data reduction technique of the present invention, screen location of the image to be generated from each piece of data in the bit stream is used as a factor when prioritizing data. In accordance with this method, data associated with the center of video pictures is assigned a relatively higher data rate than the data representing video picture edges.

Thus, because of this type of prioritization, when data are selected to form the reduced rate bit stream, a relatively high amount of data corresponding to the center of video pictures will be selected while a relatively lesser amount of the data corresponding to the edges of video pictures will be selected for inclusion in the reduced rate bit stream. In this manner, data representing the center portion of video pictures may be included in the reduced bit rate stream at the same or at a slightly reduced bit rate when compared to the full bit rate stream. However, data representing the edges of video pictures will be included in the reduced rate bit stream at a bit rate that is significantly lower than the bit rate of such data in the full bit rate data stream.

This third data reduction technique results in images that are relatively clear in the center portions of each picture but are of decreasing quality towards the edge regions of each picture.

Various test have demonstrated that the human visual system is more sensitive to some areas of a video image than others. By concentrating higher resolution images towards the center of a display screen with decreasing image quality towards the edges, the third method of the present invention takes advantage of this aspect of human image perception. By providing a method by which the available video data are used to provide video frames that are of higher quality towards their center, i.e., the portion of the image to which a person is most likely to be sensitive, the present invention provides a more efficient use of the available video data than would result by producing an image having the same quality over the entire frame.

Furthermore, such a selective decrease in image quality towards the edges of each video frame mirrors that generally obtainable from consumer televisions incorporating picture tubes. Such picture tubes are generally sharper at the center than at the edges of the tube. To provide good results when using the third data reduction method of the present invention, the increasing degree of data reduction that is performed on video frames, from the center of the frame outward, should result in a slow and gradual change in sharpness and brightness similar to that inherently associated with picture tube used in consumer televisions.

Figure 10:
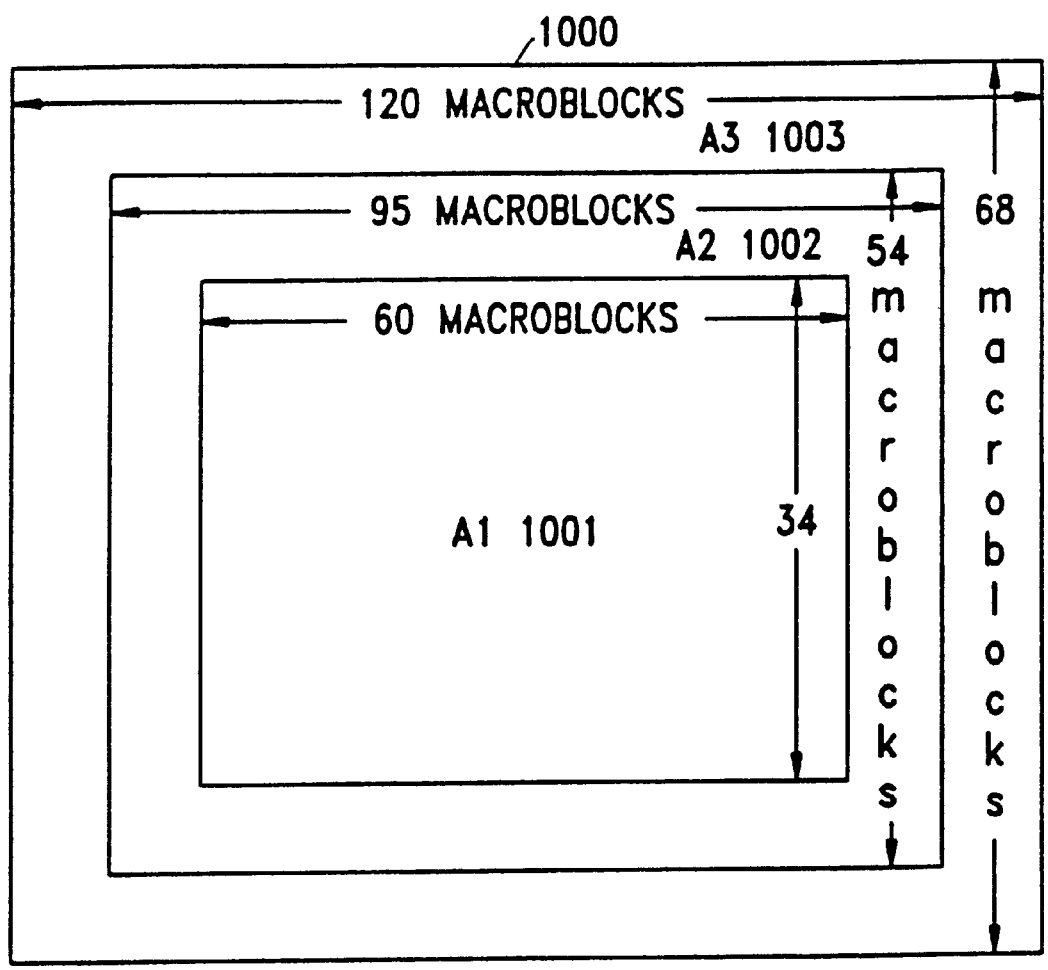
FIG. 10 is a diagram of a video frame upon which data reduction is performed in accordance with one embodiment of the present invention.

Referring now to FIG. 10A and 10B, there is illustrated a video frame 1000, e.g., a HDTV video frame including 1920×1080 pixels which are encoded into an array of 120×68 macroblocks. Thus, the video frame 1000 includes a total of 8160 macroblocks. For data reduction purposes, the video frame 1000 may be divided into three regions as illustrated in FIG. 10, e.g., a center portion or region A1 1001 including an array of 60×34 macroblocks for a total of 2040 macroblocks which represent 25% of the video frame 1000, an inner peripheral portion A2 1002 including 3090 macroblocks representing 37.9% of the video frame 1000, and an outer peripheral portion of the video frame including 3030 macroblocks representing 37.1% of the video frame 1000.

In implementing the third data reduction method of the present invention on the video frame 1000, it is possible to achieve a total data reduction of, e.g., 50%, assuming for purposes of this example that, on average, the macroblocks of each section 1001, 1002, 1003 of the video frame 1000 are represented using the same amount of data, by applying a data reduction rate of 20% to the area A1 1001, a data reduction rate of 40% to the area A2, and a data reduction rate of 80% to the area A3. In accordance with the present invention, the amount of data reduction performed on the various portions of the video frame 1000 increases towards the outer peripheral portion of the video frame as compared to the center portion of the video frame.

By performing the above described data reduction technique on video frames included in a video data stream, it is possible to achieve a desired reduction in the bit rate of the video data stream being processed.

This third data reduction technique offers a method of providing longer play modes of operation with the reduction in image resolution from long play mode operation corresponding to the same type of image quality reduction that results from the inherent limitations associated with the use of a picture tube. Because consumers are already accustomed to such image quality limitations this data reduction method offers advantages over other data reduction methods that may result in image quality problems which are more noticeable to a consumer.

Data reduction methods 1 and 3 can be combined such that data prioritization and selection can be used as the method of reducing the data rate to produce a reduced rate bit stream from a full rate bit stream.

In accordance with yet another embodiment of the present invention, data reduction methods 2 and 3 are combined to provide acceptable data reduction results for long play digital VTR operation have been achieved by increasing the quantization scale factor as a function of the screen position of the image represented by the video data. In such an embodiment the quantization scale factor is increased to a greater degree for data representing portions of images located toward the edge of the screen as opposed to the center of the screen. A total data reduction of 20–40% with satisfactory results was shown using simulations to be possible using the combination of data reduction methods 2 and 3 as the method of data reduction.

Significantly, the above described data rate reduction methods all produce reduced rate bit streams that remain compliant with the data stream format of the full rate bit stream. Accordingly, a receiver that receives a reduced rate bit stream produced by a digital VTR during long play mode operation need not know that it is receiving a reduced rate bit stream to be able to decode and display the images represented by the data in the bit stream.

Regardless of the data rate reduction method used to achieve the data reduction required to support long play mode VTR operation, when the data rate is greatly reduced, e.g., by more than 40% images that are produced from the reduced rate data stream suffer not only from having a lower resolution but also from compression artifacts. Accordingly, images produced from greatly reduced data streams suffer from blocking effects and noise patterns that occur as a result of the compression artifacts.

Compression artifacts result in patterned or colored noise. Such patterned noise is much more noticeable and objectionable to a viewer than low resolution images or white noise which is without pattern.

As will be described below, if a receiver is aware that it is receiving a reduced rate bit stream from a digital VTR operating in long play mode, it may perform special video data processing to enhance the quality of the images generated from the reduced rate bit stream received from the digital VTR.

In one embodiment, a digital VTR implemented in accordance with the present invention generates one or more signals or commands which are incorporated into the reduced rate bit stream generated during long play mode VTR operation. These signals or commands serve to indicate to a receiver that it is receiving a reduced rate bit stream. The commands generated by the VTR of the present invention may also instruct the receiver to perform specific video data processing operation on the video data, in the reduced rate bit stream, to enhance the quality of the resulting images or frames generated therefrom.

In accordance with the present invention, when a receiver detects that it is receiving a reduced rate bit stream generated by a VTR operating in long play mode, or receives a command or signal indicating VTR long play mode operation, the receiver performs image enhancement data processing operations intended to compensate for the omission of data normally found in the full rate data stream but intentionally omitted from the reduced data rate stream because of data constraints. Thus, once the receiver becomes aware that it is receiving data from a VTR operating in long play mode, the receiver performs video data processing operations to improve the quality, as it will be perceived by a viewer, of the video frames generated from the reduced rate bit stream.

In accordance with one embodiment of the present invention, to reduce both blocking effect and patterned noise in images generated from data received from a digital VTR operating in long play mode, the receiver performs low pass filtering on the video data representing individual video frames before generating images therefrom.

The amount of low pass filtering performed to generate such data representing any particular portion of an image is determined as a function of the amount of data reduction that was performed by the VTR on the data. Accordingly, data representing image portions that were subject to higher amounts of data reduction will receive more lowpass filtering than image portions upon which little or no data reduction was performed.

Another approach is to control the amount of lowpass filtering performed on the data representing any particular portion of an image as a function of what position within a video frame the image data represent. For example, if the receiver detects that video data represent an edge region of a video frame where high data reduction is normally performed, a relatively high amount of low pass filtering may be performed. On the other hand, very little low pass filtering may be performed on data representing the center portion of video frames where, in one embodiment of the present invention, relatively little data reduction is performed on video data representing this portion of a video frame.

Another method of improving subjective picture quality of images generated from the reduced rate bit stream produced during digital VTR long play mode operation, is to use dithering. Dithering refers to the addition of a small amount of uniformly distributed pseudo random noise into the video data representing portions, e.g., pixels or macroblocks, of each video frame before quantization. At display time, the same pseudo random sequence is subtracted from the output of a quantizer contained in a display device such as a receiver. While dithering will introduce some noise into the displayed video frames it has the effect of whitening the noise thereby reducing the noticeability of noise patterns resulting from data reduction.

Dithering may be used in conjunction with the second data reduction method described above wherein requantization is used to generate the reduced rate bit stream. In accordance with such an embodiment, the DCT coefficients of the full rate bit stream are first inverse quantized. Then, a pseudo random dither pattern is added to them. Next, requantization with a higher quantization scale factor is performed, and the resulting video data are variable length encoded into e.g., codewords, to form the reduced rate bit stream.

During playback operation, a decoder within the receiver reverses this operation. The decoder first performs inverse quantization on the received reduced rate bit stream. Next the decoder subtracts the pseudo random dither pattern from the DCT coefficients produced by performing the inverse quantization step. This video data are then used during long play mode playback operation to produce images which will have less objectionable noise patterns as compared to those that would have resulted without the use of dithering.

The above data rate reduction methods provide several methods that can be used either alone or in combination to generate a reduced rate bit stream suitable for use during long play modes of digital VTR operation. In addition, the above image enhancement techniques provide methods for improving the quality of the images generated from such a reduced rate bit stream. However, this alone is not enough to support long play mode VTR operation.

Operating a VTR at the lower data rate made possible by the above data reduction techniques is only useful in achieving long play mode operation if the linear data density of the tape remains the same as that achieved when operating at the data rate of the full rate bit stream that is recorded during standard mode VTR operation. In other words, in order to implement a long play mode of VTR operation, a digital VTR must be able to record the reduced rate bit stream at the same tape data density as the full rate bit stream is normally recorded on the tape. For example, a digital VTR may be capable of recording 10 MB/s for 3 hours on a fixed length of tape during standard play recording operation, i.e. when recording a full rate bit stream. If, using one of the above data reduction techniques this data rate is reduced to 5 MB/s, the VTR must be capable of recording the same amount of data on the fixed length of tape if recording time is to be doubled to achieve six hours of recording time, during long play operation.

Set forth below are five recording methods, in accordance with the present invention, for achieving the same tape data density during long play operation as is achieved during normal play operation. Each of the methods achieves this result while operating the VTR headwheel to rotate at the same rate it rotates during standard play operation and by moving the tape at a reduced rate.

The first method of supporting a reduced data rate while maintaining the same data density as used during standard play operation will now be described with reference to FIG. 1.

Referring now to FIG. 1, there is illustrated a head cylinder also referred to as a headwheel 100 with four heads 110, 112, 114, 116 distributed uniformly on the headwheel 100. The heads are of alternating azimuth, with heads 110 and 114 being of a positive azimuth and heads 112, 116 being of a negative azimuth. The headwheel 100 and the heads 110, 112, 114, 116 may be used in a digital VTR in accordance with the present invention as will now be described.

During standard play recording operation, the data from the full rate bit stream are recorded using all four heads 110, 112, 114, 116. Since the heads 110, 112, 114, 116 are of alternating azimuth, the requirement that adjacent tracks be of alternate azimuth for recording on a tape is satisfied.

Using such a headwheel and head arrangement, wherein there are H heads of alternating azimuth evenly distributed around a headwheel, and wherein H is a positive even integer, there are many different reduced data rates that are possible while maintaining the same data density on the tape and speed of headwheel rotation.

Generally, when a digital VTR has any even number of heads of alternating azimuths uniformly distributed around a headwheel such as the headwheel 100, reduced data rates of $1/n$ are possible, where n is any odd positive integer greater than one. Recording at a data rate of $1/n$ is achieved by performing the steps of:

1. Rotating the headwheel at the normal rate of rotation.
2. Running the tape at a linear speed of $1/n^{th}$ the normal tape speed.
3. Recording data the first time one of the H heads passes over the tape.
4. Waiting the next (n−1) times one of the H heads passes over the tape before recording data again.
5. Recording data the next time one of the H heads passes over the tape.
6. Repeating steps 4 and 5.

Because in this embodiment the heads are of alternate azimuths, and data are not written for an even number of head passes over the tape, at a data rate of $1/n^{th}$ the full bit stream data rate the tracks that are written will be of alternating azimuths as required.

A specific example of this first method of recording data at a reduced rate will now be described with reference to FIG. 1 and FIGS. 5a–5e. For purposes of this example, assume that the headwheel 100 with 4 heads of alternating azimuth uniformly distributed around the headwheel 100 is being used to implement long play operation using a reduced bit stream data rate ⅓ the full data rate. In accordance with the above recording method, H=4 and n=3 for the following example. The recording steps that are to be performed in accordance with the above method are as follows:

1. Rotating the headwheel 100 at the normal rate of rotation.
2. Running the tape at a linear speed of $\frac{1}{3}^{rd}$ the normal tape speed.
3. Recording data the first time one of the heads (e.g., when head one 110) passes over the tape.
4. Waiting until the next two heads (e.g., heads two and three 112, 114) pass over the tape before recording data again.
5. Recording data the third time a head (e.g., head four 116) passes over the tape.
6. Waiting until the next two heads (e.g., heads one and two 110, 112) pass over the tape.
7. Continue alternating between the recording and waiting steps.

Referring now to FIGS. 5a–5b, there is illustrated a representation of a tape 200 and the areas of the tape that will be passed over by each of the four heads 110, 112, 114, 116 as the headwheel 100 rotates and the tape move around the headwheel at ⅓ its normal linear speed.

As illustrated in FIG. 5a the tape 200 initially starts out in steps 1 and 2 of the above example completely blank.

Next, in step 3, referring now to FIG. 5b, head one 110 passes over, and records data in, the segment of the tape 200 indicated by reference numeral 300. Because the tape 200 is moving at only one third its standard play linear rate, head two 112 will pass over two thirds of segment 300 as illustrated in FIG. 5c and over one third of the next blank tape segment 400. Similarly, because of the reduced tape speed head three 114 will pass over one third of the tape segment 300 and two thirds of the blank tape segment 400 as illustrated in FIG. 5d.

In order to prevent recording over the data already recorded in tape segment 300 no data are recorded, in accordance with step 4, when head two and three 112, 114 pass over the tape 200. However, as head four 116 passes over the blank tape segment 400, as illustrated in FIG. 5e data are recorded in accordance with step 5.

The above process of waiting until a head passes over a complete blank tape segment will then be repeated. This insures that data are recorded over the full length of the tape at the reduced data rate while maintaining the same tape data density and headwheel rotation speed as used during standard play operation. Accordingly, in this example, by using a linear tape speed that is one third the standard linear tape speed and by recording the data in the above described manner, it is possible to record a reduced rate bit stream having a data rate one third the full rate bit stream data rate at the same tape data density as used during standard play operation. Furthermore, this can be achieved using the same headwheel rotation speed as used during standard mode recording operation.

Generally, the first recording method is a method of operating a digital video tape recorder to record on a tape a [reduced rate] bit stream having a data rate of $1/n^{th}$ the data rate of a full rate bit stream, where n is an odd positive integer.

The first recording method can be used with a digital VTR including a headwheel having an H number of heads of alternating azimuths uniformly distributed around the headwheel, where H is an even positive integer and n is a positive odd integer. During standard play operation such a video tape recorder rotates the headwheel at a preselected rotation rate and moves the tape at a preselected normal play tape speed when recording a full rate bit stream. The first method of the present invention for recording a reduced rate bit stream can be described, for use with such a VTR embodiment, as comprising the steps of:

a) positioning the tape in close proximity to the headwheel;
b) moving the tape around the headwheel at a speed of $1/n^{th}$ the preselected normal play tape speed;
c) rotating the headwheel at the preselected rotation rate, one of the H heads beginning a pass over the moving tape during each (360/H) degree rotation of the headwheel, each of the H heads passing over the moving tape on a diagonal relative to the length of the tape once during each complete 360 degree revolution of the headwheel;
d) passing a first one of the H heads over the tape for a first time by continuing to rotate the headwheel at the preselected rotation rate;

e) controlling the first one of the H heads to commence recording data from the reduced rate bit stream on the tape as the first one of the H heads begins to pass over the tape and to continue recording the data on the tape until the first one of the H heads completes passing over the tape for the first time;

f) continuing to rotate the headwheel at the preselected rotation rate to rotate the headwheel 360(n−1)/H degrees from the point recording was last commenced;

g) controlling the H heads to inhibit recording of data by any of the H heads that begin to pass over the tape as the tape rotates the approximately 360(n−1)/H degrees from the point recording was last commenced;

h) continuing to rotate the headwheel 360n/H degrees from the location of the head last used to record data on the tape, at the preselected rotation rate to pass a next one of the H heads, over the tape;

i) controlling the next one of the H heads to commence recording data from the reduced rate bit stream on the tape using the next one of the H heads when the next one of the H heads begins to pass over the tape and to continue recording the data on the tape until the next one of the H heads completes the pass over the tape;

j) repeating steps f through i.

The second method of recording data on a tape during long play digital VTR recording operation will now be described with reference to FIG. 2. The second method may be viewed as an enhancement to the first method of recording data.

This method requires the use of a headwheel having heads located at H uniformly distributed locations on the headwheel, where H is an even number equal to or greater than two. Each one of the H locations contains at least one head of alternating azimuth relative to the adjacent head locations on the headwheel. Accordingly, in this respect, the second recording method of the present invention uses a headwheel arrangement that is similar to that used in accordance with the first recording method. Thus, as described in regard to the first recording method, this head arrangement can be used to support recording data at a reduced data rate of 1/n where n is any odd positive integer greater than one.

However, to support recording at data rates of 2/Xh, where x is any positive integer, in addition to reduced data rates of 1/n, a pair of co-located heads, comprising heads of opposite azimuth, is located in at least one of the H head locations. Each head in a pair of co-located heads travels over the same path as the other head in the pair of co-located heads at almost exactly the same time.

Figure 2:
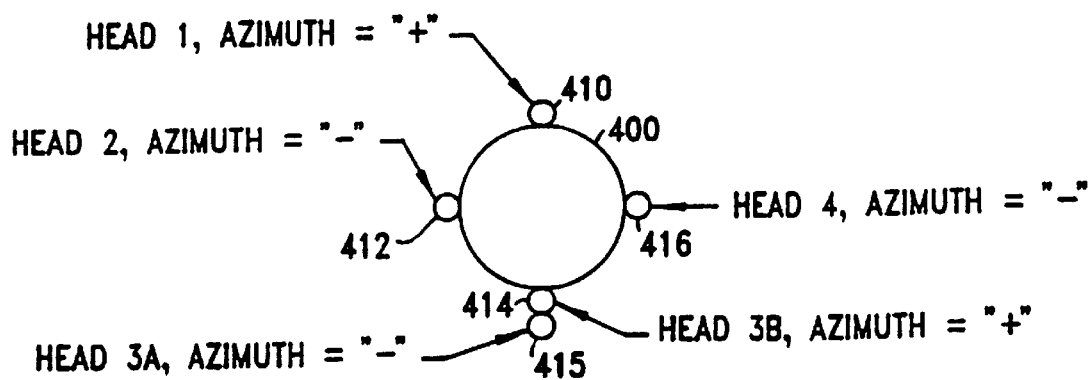
FIG. 2 is a representative diagram of a VTR head assembly comprising five heads, including one set of co-located heads.

A headwheel and head arrangement suitable for use in accordance with this second method of recording a reduced rate bit stream is illustrated in FIG. 2. As illustrated in FIG. 2, a headwheel 400 may have, e.g., four evenly distributed head locations each containing at least one head 410, 412, 414, 416. Furthermore, one of the head locations contains a second head 415 which results in a pair of co-located heads of opposite azimuth being located in one of the four head locations.

Recording at a data rate of 2/xH times the data rate of the full rate bit stream is achieved by performing the following steps of:

1. Rotating the headwheel at the normal rate of rotation.
2. Running the tape at a linear speed of 2/xH the normal linear tape speed, where x is a positive integer, and H is the number of heads.
3. Recording data when the headwheel is at the position of at least one pair of co-located heads, using a head having an azimuth that is opposite that of the head located 180 degrees from the at least one pair of co-located heads when there is a single head located opposite the at least one pair of co-located heads or using a head of the at least one pair of co-located heads having an arbitrary azimuth if there is a pair of co-located heads located opposite the at least one pair of co-located heads.
4. Waiting until (xH/2)−1 head locations have passed over the tape.
5. Recording data using a head at the next head location to pass over the tape. If this head position is populated with a non-colocated head, the azimuth will be correct; if it is populated with a co-located head, use the azimuth that is opposite the previously recorded azimuth.
6. Repeating steps 4 through 5.

Using this method and a headwheel arrangement with four head positions, one of which contains a pair of co-located heads, as illustrated in FIG. 2, recording at a reduced data rate of ½ the normal data rate can be achieved. Recording at ½ the normal data rate in such a system as the one illustrated in FIG. 2, where H equals four, is achieved by performing the following steps:

1. Rotating the headwheel 400 at the normal rate of rotation.
2. Running the tape at a linear speed of ½ the normal tape speed.
3. Recording data using the head 3A 415 in the pair of co-located heads, which is of negative azimuth, when the pair of co-located heads 414, 415 pass over the tape.
4. Recording data when head one 410, which is of positive azimuth and is located on the headwheel directly opposite the pair of co-located heads, passes over the tape.
5. Repeating steps 3 and 4.

Generally, the second recording method is a method of operating a digital video tape recorder to record on a tape a reduced rate bit stream having a data rate of 2/xH the data rate of a full rate bit stream, where x is a positive integer greater than 2 and H is equal to two, or where X is any positive integer when H is an even positive integer greater than 2.

The second recording method can be used with a digital video tape recorder which has: a headwheel having heads of alternating azimuths uniformly distributed around the outer edge of the headwheel, at least one head centered at each one of the H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co-located heads containing a head of a second azimuth. During standard mode VTR recording operation such a video tape recorder rotates the headwheel at a preselected rotation rate and moves the tape at a preselected normal play tape speed when recording the full rate bit stream. Applying the second recording method of the present invention to such a digital VTR the second method of recording the reduced rate bit stream may be described as comprising the steps of:

a) positioning the tape in close proximity to the headwheel;

b) moving the tape around the headwheel at a speed of 2/xH the preselected normal play tape speed;

c) rotating the headwheel at the preselected rotation rate, one of the head locations beginning a pass over the moving tape during each (360/H) degree rotation of the headwheel, each of the H head locations passing over the moving tape on a diagonal relative to the length of the tape once during each complete 360 degree revolution of the headwheel;

d) passing the at least one pair of co-located heads over the tape for a first time by continuing to rotate the headwheel at the preselected rotation rate;

e) controlling the first head of a first azimuth of the at least one pair of co-located heads to commence recording data from the reduced rate bit stream on the tape as the first head begins to pass over the tape and to continue recording the data on the tape until the first head completes passing over the tape;

f) continuing to rotate the headwheel at the preselected rotation rate to rotate the headwheel (360/H)(xH/2−1) degrees from the point recording was last commenced;

g) controlling the record heads to inhibit recording of data by any of the record heads that begin to pass over the tape as the tape rotates the (360/H)(xH/2−1) degrees from the point recording was last commenced;

h) continuing to rotate the headwheel at the preselected rotation rate to begin passing a next one of the head locations, located on the headwheel (360x/2) degrees from the one of the recording locations where the head last used to record data on the tape is located;

i) controlling a next one of the heads located at the next one of the record head locations and having an azimuth differing from the azimuth of the last head used to record data on the tape, to commence recording data from the reduced rate bit stream on the tape using the next one of the heads when the next one of the heads begins to pass over the tape and to continue recording the data on the tape until the next one of the heads completes the pass over the tape;

j) repeating steps f through i.

A third method for recording a reduced rate bit stream at the same tape data density that a full rate bit stream is recorded will now be described. This third method is suitable for use with VTRs where there are heads at only a single position of the VTR's headwheel 500, and this position is populated with a pair of co-located heads 502, 504 as illustrated in FIG. 3.

Before describing the third reduced data rate recording method of the present invention, a method of recording a full rate bit stream on a tape using a single pair of co-located heads will be described with reference to FIG. 3. As illustrated in FIG. 3, a single pair of co-located heads 502, 504 are mounted on the headwheel 500. The first head 502, referred to hereafter as head 1A 502, is of positive azimuth, while the second head in the head pair 504, referred to hereafter as head 1B 504, is of negative azimuth.

Recording of a full rate bit stream using a single pair of co-located heads is performed as follows:

1. Rotating the headwheel 500 at the normal rate of rotation.
2. Running the tape at a linear speed of one times normal tape speed.
3. Recording data on the tape using head 1A 502 when the pair of co-located heads 502, 504 pass over the tape.
4. Recording data on the tape using head 1B 504 the next time the pair of co-located heads 502, 504 pass over the tape.
5. Repeating steps 3 and 4.

In accordance with the above method of recording a full rate bit stream on a tape using a single pair of co-located heads, tracks of alternating azimuths will be recorded on the tape by alternating between recording using the head of a positive azimuth and the head of a negative azimuth.

Playback of a full rate bitstream using a headwheel assembly comprising a single pair of co-located heads, as illustrated in FIG. 3, will now be described with reference to FIG. 3. Playback of a full rate data stream using a single pair of co-located heads may be performed as follows:

1. Rotating the headwheel, e.g., the headwheel 500, at the normal rate of rotation.
2. Running the tape at the normal linear tape speed.
3. Aligning the location of the single pair of co-located on the headwheel with a track of positive azimuth recorded on the tape.
4. Reading data from the tape for inclusion in the full rate data stream using head 1A, 502, when the single pair of co-located heads 502, 504 pass over the tape.
5. Reading data from the tape for inclusion in the full rate data stream using head 1B 504, when the single pair of co-located heads 502, 504 next pass over the tape.
6. Repeating steps 4 and 5.

Recording a reduced rate bit stream having a data rate of $1/x^{th}$ the data rate of the full rate bit stream, where x is a positive integer, is possible by using the third recording method of the present invention. In accordance with the third recording method of the present invention a recording rate of $1/X^{th}$ the full rate is achieved using a headwheel with a single pair of co-located heads by performing the following steps:

1. Rotating the headwheel at the normal rate of rotation.
2. Running the tape at a linear speed of $1/x^{th}$ the normal tape speed, wherein x is a positive integer.
3. Recording data on the tape using a first head in the pair of co-located heads located on the headwheel when the pair of co-located heads pass over the tape for the first time.
4. Rotating the headwheel (x−1) rotations without recording additional data on the tape.
5. Recording data using the second head in the pair of co-located heads mounted on the headwheel, the next time the pair of co-located heads is positioned over the tape.
6. Rotating the headwheel (x−1) rotations without recording additional data on the tape.
7. Repeating steps 3 through 6.

For example, applying this method using the headwheel arrangement illustrated in FIG. 3, to record data at a data rate of ½ the data rate of a full rate bit stream, the following steps would be performed:

1. Rotating the headwheel 500 at the normal rate of rotation.
2. Running the tape at a linear speed of ½ the normal tape speed.
3. Recording data on the tape, using head 1A 502 in the pair of co-located heads located on headwheel 500, when the pair of co-located heads 502, 504 pass over the tape for the first time.
4. Rotating the headwheel 500, one full rotation without recording additional data on the tape.
5. Recording data on the tape, using head 1B 504 in the pair of co-located heads 502, 504 mounted on the headwheel 500, the next time the pair of co-located heads 502, 504 is positioned over the tape.
6. Rotating the headwheel 500, one full rotation without recording additional data on the tape.
7. Repeating steps 3 though 6.

Generally, the third recording method can be used as a method of operating a digital video tape recorder to record, on a tape, a reduced rate bit stream having a data rate of $1/x^{th}$ the data rate of the full rate bit stream, where x is a positive integer greater than one.

Recording method three can be used with a digital video tape recorder that has a headwheel having a single pair of co-located heads mounted on the outer edge of the headwheel, the single pair of co-located heads including a first head of a first azimuth and a second head of a second azimuth. During standard VTR recording mode operation such a digital VTR rotates the headwheel at a preselected rotation rate and moves the tape at a preselected normal play tape speed when recording a full rate bit stream. When applying the third method of the present invention to such a digital VTR, the third method of recording the reduced rate bit stream may be described as comprising the steps of:

a) positioning the tape in close proximity to the headwheel;

b) moving the tape around the headwheel at a speed of $1/x^{th}$ the preselected normal play tape speed;

c) rotating the headwheel at the preselected rotation rate, the single pair of co-located heads passing over the moving tape on a diagonal relative to the length of the tape once during each complete 360 degree revolution of the headwheel;

d) passing the single pair of co-located heads over the tape by continuing to rotate the headwheel at the preselected rotation rate;

e) controlling the second head to inhibit the second head from recording data while the single pair of co-located heads passes over the tape;

f) controlling the first head to record data from the reduced rate bit stream on the tape as the single pair of co-located heads pass over the tape;

g) passing the single pair of co-located heads over the tape (x-1) times without recording data by continuing to rotate the headwheel at the preselected rotation rate;

h) passing the single pair of co-located heads over the tape for an $x^{th}$ time after the last pass over the tape during which data was recorded;

i) controlling the first head to inhibit the first head from recording data from the reduced rate bit stream on the tape while the single pair of co-located heads passes over the tape for the $x^{th}$ time since the last pass over the tape during which data was recorded;

j) controlling the second head to record data from the reduced rate bit stream on the tape while the single pair of co-located heads passes over the tape for the $x^{th}$ time since the last pass over the tape during which data was recorded;

k) passing the single pair of co-located heads over the tape (x-1) times without recording data by continuing to rotate the headwheel at the preselected rotation rate; and l) passing the single pair of co-located heads over the tape for an $x^{th}$ time after the last pass over the tape during which data was recorded;

m) repeating steps e through l.

A fourth method of recording data at a reduced rate on a tape will now be described with reference to FIG. 8. This method is applicable to digital VTRs where at least every other head location on the headwheel is populated with a co-located head.

Figure 8:
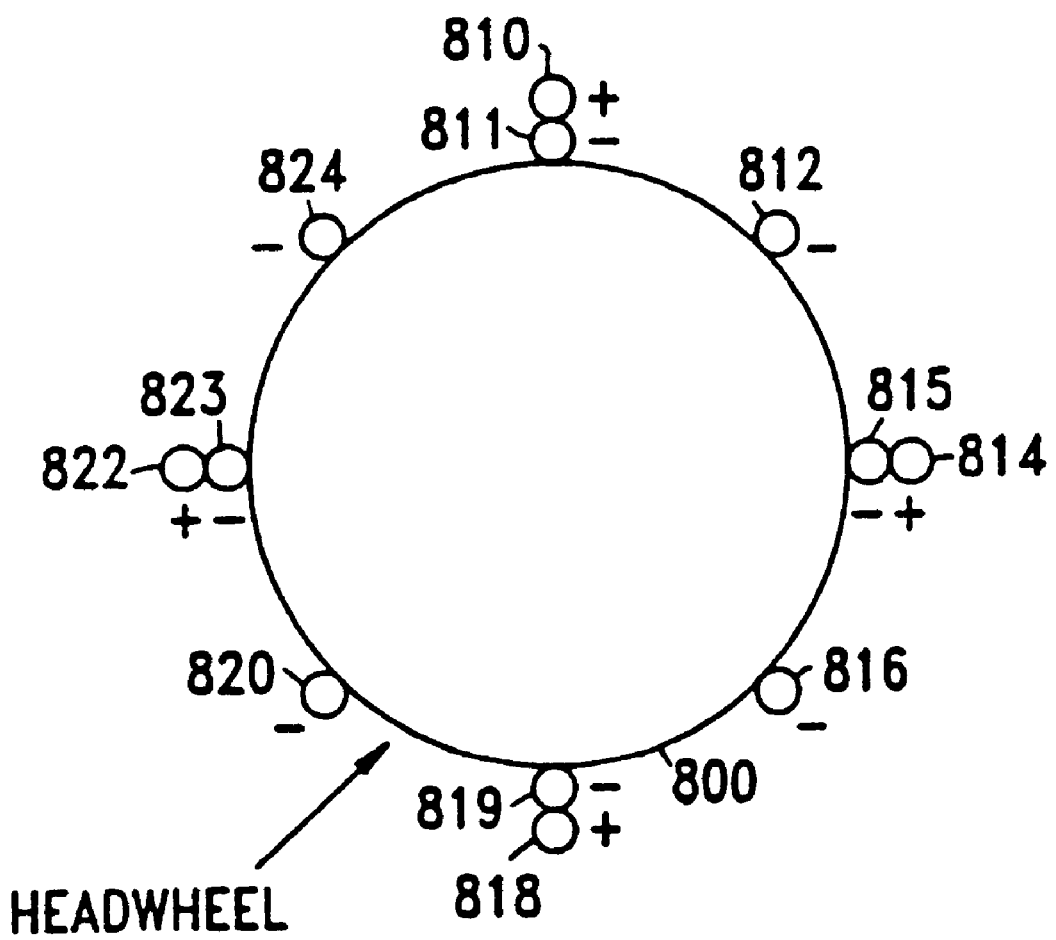
FIG. 8 is a representative diagram of a VTR head assembly which may be used in accordance with one embodiment of the present invention.

As illustrated in FIG. 8, a headwheel 800 may have, e.g., eight evenly distributed head locations each containing at least one head 810, 812, 814, 816, 818, 820, 822, 824. Furthermore, every other one of the head locations contains a second head 811, 815, 819, 823 which results in pairs of heads of opposite azimuth being located in four of the eight head locations.

Recording at a data rate of 1/x times the data rate of the full rate bit stream, where x is any positive integer, is achieved by performing the following steps of:

1. Rotating the headwheel at the normal rate of rotation.
2. Running the tape at a linear speed of 1/x the normal linear tape speed, where x is any positive integer.
3. Recording data using one of the colocated heads that is located adjacent to a non-colocated head, using the azimuth that is opposite that of the non-colocated heads or a head having an arbitrary azimuth if all head locations contain co-located heads.
4. Waiting until x-1 head locations have passed over the tape.
5. Recording a track using a head located at the next head location to pass over the tape. If this head is a non-colocated head, it will be of the correct azimuth, if this is a colocated head position, use the opposite azimuth from that recorded on the previous track.
6. Repeating steps 4 and 5.

Using this method and a headwheel arrangement with eight head positions, half of which contain a pair of colocated heads, as illustrated in FIG. 8, recording at a reduced data rate of 1/10 the normal data rate can be achieved. Recording at 1/10 the normal data rate in such a system as the one illustrated in FIG. 8, where H equals 8, is achieved by performing the following steps:

1. Rotating the headwheel at the normal rate of rotation.
2. Running the tape at a linear speed of 1/10 the normal linear tape speed.
3. Recording data using head 810 at positive azimuth.
4. Waiting until 9 heads have passed over the tape (1 full rotation of the headwheel plus an additional 45 degrees).
5. Recording a track using the next head 815. Since the previous track was written at positive azimuth, this track is written using negative azimuth.
6. Waiting until 9 heads have passed over the tape (1 full rotation of the headwheel plus an additional 45 degrees).
7. Recording a track using the next head.
8. Repeating steps 6 and 7.

Generally, the fourth recording method of the present invention can be used as a method of operating a digital video tape recorder to record a reduced rate bit stream having a data rate of 1/x the data rate of a full rate bit stream on a tape, where x is a positive integer greater than one.

The fourth recording method can be used with a digital VTR that has a headwheel having H head locations located on the headwheel 360/H degrees apart, where each of the odd numbered head locations contains a pair of co-located heads including a first head of a first azimuth and a second head of a second azimuth, and each of the even numbered locations includes a head of the first azimuth. During standard mode VTR operation such a video tape recorder rotates the headwheel at a preselected rotation rate and moves the tape at a preselected normal play tape speed when recording a full rate bit stream. When applying the fourth method of recording a reduced rate bit stream to such a digital VTR, the fourth method of recording the reduced rate bit stream can be described as comprising the steps of:

a) positioning the tape in close proximity to the headwheel;

b) moving the tape around the headwheel at a speed of 1/x the preselected normal play tape speed;

c) rotating the headwheel at the preselected rotation rate, one of the H head locations beginning a pass over the moving tape during each (360/H) degree rotation of the headwheel, each of the H head locations passing over the moving tape on a diagonal relative to the length of the tape once during each complete 360 degree revolution of the headwheel;

d) passing a one of the odd numbered head locations over the tape by continuing to rotate the headwheel at the preselected rotation rate;

e) controlling the second head located at the one of the odd numbered head locations passing over the tape to commence recording of data from the reduced rate bit stream on the tape as the odd numbered head locations begins to pass over the tape and to continue recording the data on the tape until the one of the odd numbered head locations completes passing over the tape, while inhibiting the first head located at the one of the odd numbered head locations from recording on the tape;

f) continuing to rotate the headwheel at the preselected rotation rate to rotate the headwheel 360(x-1)/H degrees from the point recording was last commenced;

g) controlling the record heads to inhibit recording of data by any of the heads located in the H head locations that begin to pass over the tape as the tape rotates the 360(x-1)/H degrees from the point recording was last commenced;

h) continuing to rotate the headwheel at the preselected rotation rate to pass a next one of the H head locations located 360x/H degrees from the location of the head last used to record data on the tape, over the tape;

i) controlling the head of a differing azimuth from the azimuth of the head last used to record data, located at the next one of the H head locations, to commence recording data from the reduced rate bit stream on the tape when the next one of the H head locations begins to pass over the tape and to continue recording the data on the tape until the next one of the H head locations completes the pass over the tape, while inhibiting other heads at the next one of the H head locations from recording on the tape;

j) repeating steps f through i.

A fifth method of recording data at a reduced data rate on a tape will now be described with reference to FIG. 4. This method is applicable to digital VTRs where every head location on the digital VTR's headwheel is populated with H heads of opposite azimuth that are centered one track width apart from each other, where H is an even positive integer.

Referring now to FIG. 4, there is illustrated a headwheel arrangement suitable for use in accordance with the fifth data recording method of the present invention. The headwheel assembly illustrated in FIG. 4 includes a headwheel 600 with a single head location. In the embodiment of FIG. 4, H=8 and thus there are eight heads of alternating azimuth located one track width apart from each other. These heads include heads one through eight which are represented by the reference numerals 601, 602, 603, 604, 605, 606, 607 and 608, respectively. As illustrated, in this embodiment, the odd numbered heads 601, 603, 605, and 607 are of positive azimuth while the even numbered heads 602, 604, 606 and 608 are of negative azimuth.

Using the headwheel arrangement illustrated in FIG. 4, eight tracks are recorded on the tape during standard mode recording operation during each complete rotation of the headwheel. Since all the heads are used to record data during standard play operation, and the heads 601–608 are located one track width apart the eight tracks are recorded with the proper track spacing and with alternating azimuths during each revolution of the headwheel 600 during standard mode recording operation.

Additional sets of heads, i.e., H heads of opposite azimuth may be located at each of any plurality of uniformly distributed head locations on the headwheel 600. However, increasing the number of sets of heads merely requires a corresponding decrease in the head rotation speed as compared to when a single set of heads is used.

The discussion of recording method five of the present invention will be described in terms of the case where there is a single set of H heads of alternating azimuths located at a single location on the headwheel. With such a head configuration there are two possible methods of recording data at a reduced data rate while maintaining the same tape data density and headwheel rotation speed as used during standard mode VTR recording operation.

The first of these two methods which will be referred to as method 5a relies on skipping heads, e.g., using only selected heads for recording operations. The second recording method, referred to as method 5b, involves not recording during particular periods of headwheel rotation.

Recording method 5a will now be described. In accordance with this method recording a [reduced rate] bit stream having a data rate of 2m/H times the data rate of the full rate bit stream is possible, where m is a positive integer between 1 and H/2, and where, as discussed above, H is an even positive integer representing the number of heads located at any one particular location on a headwheel.

Recording at a data rate of 2m/H times the full data rate is achieved by performing the following steps:

1. Rotating a headwheel at the normal rate of rotation.
2. Running the tape at a linear speed of 2m/H times the normal tape speed, wherein H is an even positive integer representing the number of heads located at a location on the headwheel and m is a positive integer between 1 and H/2.
3. Recording data on the tape using 2m adjacent heads on each pass of the heads over the tape.

For example, if a reduced rate bit stream had a data rate ¾ the data rate of the full rate bit stream, the reduced rate bit stream could be recorded on a tape using the headwheel arrangement illustrated in FIG. 4 by performing the following steps:

1. Rotating the headwheel 600 at the normal rate of rotation.
2. Running the tape at a linear speed of ¾ times the normal tape speed.
3. Recording data on the tape using six adjacent heads, e.g., head 1 through head 6, 601, 602, 603, 604, 605, 606 on each pass of the heads 601 through 608 over the tape.

Generally, recording method 5a [is] can be used as a method of operating a digital video tape recorder to record on the tape a reduced rate bit stream having a data rate of (2m/H) times the data rate of the full rate bit stream, where m is a positive integer between 1 and H/2, and where H is an even positive integer greater than 2.

Recording method 5a can be used with a digital VTR including a headwheel having a series of H heads of alternating azimuths, where each of the H heads are centered one track width apart from each other and the series of H heads is located at a single location on the headwheel. During standard mode digital VTR recording operation the digital video tape recorder rotates the headwheel at a preselected rotation rate and moves the tape at a preselected normal play tape speed when recording the full rate bit stream. When applying recording method 5a to such a digital VTR recording method 5a for recording the reduced rate bit stream can be described as comprising the steps of:

a) positioning the tape in close proximity to the headwheel;

b) moving the tape around the headwheel at a speed of (2m/H) times the preselected normal play tape speed;

c) rotating the headwheel at the preselected rotation rate, each of the H heads in the series of H heads passing over the moving tape on a diagonal relative to the length of the tape once during each complete 360 degree revolution of the headwheel;

d) passing the series of H heads over the tape by continuing to rotate the headwheel at the preselected rotation rate;

e) controlling a set of 2m adjacent heads of the series of H heads to record data from the reduced rate bit stream on the tape while the set of 2m adjacent heads pass over the tape and inhibiting the ones of the H heads not included in the set of 2m adjacent heads from recording data on the tape while the series of H heads passes over the tape;

f) continuing to rotate the headwheel at the preselected rotation rate to rotate the headwheel 360 degrees from the point where the set of H heads began to pass over the tape;

g) repeating steps d through f.

Recording method 5b will now be described. In accordance with recording method 5b, recording at a [reduced] data rate of 1/p times the data rate of a full rate bit stream is possible, where p is a positive integer, using a headwheel arrangement wherein a plurality of H heads of alternating azimuth are located at a head location on a VTR headwheel. In accordance with this method, recording at a data rate of 1/p times the standard data rate is achieved by performing the following steps:

1. Rotating a headwheel at the normal rate of rotation.
2. Running the tape at a linear speed of 1/p times the normal tape speed, wherein p is a positive integer.
3. Recording data on the tape using all the heads on the headwheel once for every p rotations of the head wheel.

For example, to achieve recording at a reduced data rate of ½ the data rate of a full rate bit stream using the headwheel 600 of FIG. 4, the following steps are to be performed:

1. Rotating the headwheel 600 at the normal rate of rotation.
2. Running the tape at a linear speed of ½ times the normal tape speed.
3. Recording data on the tape using all the heads 601, 602, 603, 604, 605, 606, 607, 608 on the headwheel once for every 2 complete rotations of the headwheel 600.

Generally, recording method 5b [is] can be used as a method of operating a digital video tape recorder to record on the tape a reduced rate bit stream having a data rate of (1/p) times the data rate of a full rate bit stream, where p is a positive integer greater than one.

Recording method 5b can be used with a digital VTR including a headwheel having a series of H heads of alternating azimuths, where each of the H heads are centered one track width apart from each other and the series of H heads is located at a single location on the headwheel. During standard VTR recording mode operation the digital video tape recorder rotates the headwheel at a preselected rotation rate and moves the tape at a preselected normal play tape speed when recording the full rate bit stream. When applying recording method 5b to such a digital VTR, method 5b of recording a reduced rate bit stream on a tape, may be described as comprising the steps of:

a) positioning the tape in close proximity to the headwheel;

b) moving the tape around the headwheel at a speed of (1/p) times the preselected normal play tape speed;

c) rotating the headwheel at the preselected rotation rate, the series of H heads passing over the moving tape on a diagonal relative to the length of the tape once during each complete 360 degree revolution of the headwheel;

d) passing the series of H heads over the tape by continuing to rotate the headwheel at the preselected rotation rate;

e) controlling the H heads in the series of H heads to record data from the reduced rate bit stream on the tape while the series of H heads passes over the tape;

f) passing the series of H heads over the tape (p−1) times without recording data on the tape by continuing to rotate the headwheel at the preselected rotation rate;

g) passing the series of heads over the tape for a p time after the last pass over the tape during which data was recorded;

h) controlling the H heads in the series of H heads to record data from the reduced rate bit stream on the tape while the series of H heads passes over the tape for the p time since the last pass over the tape during which data was recorded; and i) repeating steps f through h.

Recording methods 5a and 5b can be combined to provide recording at various reduced data rates. The general reduced data rate at which data can be recorded when such a combination is employed, is expressed by the general equation 2m/Hp where m, H and p refer to the values defined above in regard to recording methods 5a and 5b.

For example, methods 5a and 5b can be combined and used in conjunction with the headwheel arrangement illustrated in FIG. 4. If such a combination is made recording at a reduced data rate of ⅜ the data rate of a full rate bit stream can be achieved by using six adjacent heads out of the eight heads illustrated in FIG. 4, to support a reduction in the recording rate of ¾, and by recording data using the six heads only on every other rotation of the head wheel 600. This recording on only every other rotation of the heads supports a further reduction of the data rate by ½.

Accordingly, by combining these two recording methods recording at ⅜ the standard data rate is achieved (⅜=¾*½) when the tape is run at ⅜ the normal tape speed and the headwheel is rotated at the normal headwheel speed of rotation.

Such headwheel arrangements are particularly well suited for use in digital VTRs designed for recording HDTV because such a head arrangement permits multiple tracks, i.e., H tracks, to be recorded simultaneously on a tape. This provides a convenient method of supporting the high data rates that are necessary for recording digital HDTV transmissions.

The above methods of recording a full rate bit stream and a reduced rate bit stream may be employed to produce a VTR that can receive and record data streams having different data rates. In such an embodiment, the highest rate data stream the digital VTR is designed to receive would be treated as the full rate data stream. Data streams having a lower data rate than the full rate data stream would be treated as a reduced rate data stream and would be recorded in accordance with the above described methods for recording reduced rate data streams.

While the above described recording methods are described in terms of recording a reduced rate bit stream and a full rate bit stream, it is to be understood that the applicability of these recording methods is not limited to the case where a digital VTR generates a reduced rate bit stream from a received bit stream. The reduced data rate recording methods of the present invention may be used by a digital VTR to record data streams of different data rates that are received by a digital VTR of the present invention. In such a case, where the digital VTR receives bit streams of multiple data rates, the highest data rate the digital VTR is designed to record at is to be treated as the full data rate with all bit streams having a lower data rate are to be treated, by the digital VTR, as reduced rate bit streams.

For example, a digital VTR in accordance with the present invention could be designed to receive a first bit stream having a first data rate and a second bit stream having a data rate that is lower than the data rate of the first bit stream. In such a case, the first bit stream would be considered the full rate bit stream and the second bit stream the reduced rate bit stream. The second bit stream may be recorded using one of the above described recording methods of the present invention.

In addition to the above methods of recording a reduced rate bit stream on a tape, the present invention is also directed to methods of reading back data from a tape at less than the maximum data rate possible for a given head configuration. The playback methods of the present invention may be used to read back previously recorded from a tape at data rate that is a fraction of the full or maximum data rate possible. In the context of referring to VTR playback circuits in this patent application, the phrase full playback data rate is used to refer to the maximum data rate that can be read from a tape when rotating a headwheel, having the particular head arrangement being referred to, at a preselected rate of rotation and when moving the tape at a preselected normal play tape speed.

It should be noted that the phrase "pre-recorded data" is used to refer to data that was previously recorded on the tape in a series of tracks of alternating azimuths.

During standard playback operation of each of the video tape recorders described with regard to playback operation, the video tape recorders rotate the headwheel at a preselected rate of rotation and move the tape at a preselected standard play tape speed when reading pre-recorded data at the full data rate. The preselected rotation rate and preselected normal play tape speed supported by each digital VTR are, as with the case of the recording methods, a matter of design choice when implementing a digital VTR.

A first method for reading data which will now be referred to as playback method one, can be used with a digital VTR including a headwheel having an H number of heads of alternating azimuths uniformly distributed around the headwheel, where H is an even positive integer. During standard playback operation such a video tape recorder rotates the headwheel at a preselected rotation rate and moves the tape at a preselected normal play tape speed when reading pre-recorded data at the full data rate.

Playback method one of the present invention is a method for reading pre-recorded data at a data rate of $1/n^{th}$ the data rate of the full rate bit stream where n is a positive odd integer. Playback method one of the present invention for reading pre-recorded data from a tape at a reduced data rate can be described as comprising the steps of:

1. Rotating the headwheel at the preselected rate of rotation.
2. Moving the tape around the headwheel at a linear speed of $1/n^{th}$ the preselected standard play tape speed.
3. Aligning the H heads with the pre-recorded tracks on the tape such that a one of the H heads is aligned with a track of the same azimuth as the one of the H heads.
4. Reading pre-recorded data from the tape whenever any of the H heads pass over the tape.
5. Commencing to select data read from the tape by the one of the H heads, as the one of the H heads begins to pass over the tape, for inclusion in the reduced rate data stream and continuing to select, for inclusion in the reduced rate data stream, data read by the one of the H heads while the one of the H heads continues to pass over the tape.
6. Continuing to rotate the headwheel $360(n-1)/H$ degrees from the point selection of data for inclusion in the reduced rate data stream was last commenced, while excluding from the reduced rate data stream data read by any of the H heads that begin to pass over the tape while the headwheel rotates the $360(n-1)/H$ degrees.
7. Continuing to rotate the headwheel at the preselected rate of rotation to reach a next one of the H heads located $360(n)/H$ degrees from the head that read the data that was last selected for inclusion in the reduced rate data stream.
8. Commencing to select data read from the tape by the next one of the H heads, as the next one of the H heads begins to pass over the tape, for inclusion in the reduced rate data stream and continuing to select, for inclusion in the reduced rate data stream, data read by the next one of the H heads while the next one of the H heads continues to pass over the tape.
9. Repeating steps 6 through 8.

In general terms, playback method one may be described as comprising the following steps:

1. Rotating the headwheel at the normal rate of rotation.
2. Running the tape at a linear speed of $1/n^{th}$ the normal tape speed, where n is any positive odd integer.
3. Reading data whenever one of the H heads passes over the tape.
4. Aligning the heads and tape such that a one of the heads is aligned with a track of the same azimuth as the one of the heads.
5. Selecting data read by the one of the heads for inclusion in the reduced rate data stream.
6. Ignoring data read from the tape by the next $(n-1)$ heads to pass over the tape.
7. Selecting data, read from the tape by the next one of the H heads to pass over the tape, for inclusion in the reduced rate bit stream.
8. Repeating steps 6 and 7.

A second method for reading data which will now be referred to as the playback method 2, can be used with a digital VTR which has: a headwheel having heads of alternating azimuths uniformly distributed around a headwheel, at least one head centered at each one of the H locations on the headwheel located (360/H) degrees apart, at least one pair of co-located heads located at at least one of the H locations, the at least one pair of co-located heads including a first head of a first azimuth and a second head of a second azimuth, the one of the H locations located 180 degrees from the at least one pair of co-located heads containing a head of a second azimuth.

Playback method two of the present invention is a method for reading pre-recorded data at a data rate of 2/xH the data rate of the full playback data rate, where x is a positive integer and H is an even positive integer. Playback method two of the present invention can be described, as comprising the steps of:

1. Rotating the headwheel at the preselected rate of rotation.
2. Moving the tape around the headwheel at a linear speed of 2/xH the preselected standard play tape speed.
3. Aligning the H heads with the pre-recorded tracks on the tape such that the at least one pair of co-located heads is aligned with a track of the first azimuth.
4. Reading pre-recorded data from the tape whenever one of the heads located in one of the H head locations passes over the tape.
5. Commencing to select data read from the tape by the first head of the at least one pair of co-located heads, as the at least one pair of co-located heads begins to pass over the tape and continuing to select, for inclusion in the reduced rate data stream, data read by the first head of the at least one pair of co-located heads while the at least one pair of colocated heads continues to pass over the tape and excluding data from the reduced rate data stream read by the second head of the at least one pair of co-located heads while the at least one pair of colocated heads passes over the tape.
6. Continuing to rotate the headwheel (360/H) (xH/2−1) degrees from the point selection of data for inclusion in the reduced rate data stream was last commenced, while excluding from the reduced rate data stream data read by any of the heads located at the H head locations that begin to pass over the tape while the headwheel rotates the (360/H)(xH/2−1) degrees.
7. Continuing to rotate the headwheel at the preselected rate of rotation to reach a next one of the H head locations, located (360x/2) degrees from the head location that contains the head that read the data that was last selected for inclusion in the reduced rate data stream.
8. Commencing to select data read from the tape by a next head located at the next one of the H head locations having an azimuth that differs from the azimuth of the head last used to read data selected for inclusion in the reduced rate data stream and continuing to select, for inclusion in the reduced rate data stream, data read by the next head while the next one of the H head locations continues to pass over the tape;
9. Repeating steps 6 through 8.

In general terms, playback method two may be described as comprising the following steps:

1. Rotating the headwheel at the normal rate of rotation.
2. Running the tape at a linear speed of 2/xH the normal tape speed, where x is a positive integer, and H is the number of heads.
3. Reading data whenever one of the H heads passes over the tape.
4. Aligning the heads and tape such that if there is one head location that contains only a single head, a colocated head of the opposite azimuth from the single head located 180 degrees from the single head is aligned with a track of the azimuth that is opposite the azimuth of the single head. However, if all head locations contain co-located heads, a colocated head is aligned with a track of the same azimuth as the colocated head.
5. Selecting data from the colocated head for inclusion in the reduced rate bit stream.
6. Ignoring data read from the tape by the next (xH/2)−1 head locations to pass over the tape.
7. Selecting data read by the head located at the next head location for inclusion in the reduced data rate bit stream, using the azimuth that is opposite that of the previously included head.
8. Repeating steps 6 and 7.

A third method for reading data which will now be referred to as the playback method 3, can be used with a digital VTR that has a headwheel having a single pair of co-located heads mounted on a headwheel, the single pair of co-located heads including a first head of a first azimuth and a second head of a second azimuth.

Playback method three of the present invention is a method for reading pre-recorded data at a data rate of $1/x^{th}$ the data rate of the full data rate, where x is a positive integer. Playback method three of the present invention can be described, as comprising the steps of:

1. Rotating the headwheel at the preselected rate of rotation.
2. Moving the tape around the heedwheel at a linear speed of $1/x^{th}$ the preselected standard play tape speed, where x is a positive integer.
3. Aligning the single pair of co-located heads with one of the pre-recorded tracks of the first azimuth on the tape.
4. Reading pre-recorded data from the tape whenever the single pair of co-located heads passes over the tape.
5. Passing the single pair of co-located heads over the tape by continuing to rotate the headwheel at the preselected rate of headwheel rotation.
6. Selecting data, for inclusion in the reduced rate data stream, read from the tape by the first head while the single pair of co-located heads passes over the tape and excluding data read by the second head while the single pair of co-located heads passes over the tape.
7. Continuing to rotate the headwheel to pass the single pair of co-located heads over the tape x−1 times while excluding data read from the tape during the x−1 passes over the tape from being included in the reduced rate data stream.
8. Passing the single pair of co-located heads over the tape by continuing to rotate the headwheel at the preselected rate of headwheel rotation.
9. Selecting data, for inclusion in the reduced rate data stream, read from the tape by the second head while the single pair of co-located heads passes over the tape and excluding data read by the first head while the single pair of co-located heads passes over the tape.
10. Continuing to rotate the headwheel to pass the single pair of co-located heads over the tape x−1 times while excluding data read from the tape during the x−1 passes over the tape from being included in the reduced rate data stream.
11. Repeating steps 5 through 10.

In general terms, playback method three may be described as comprising the following steps:

1. Rotating the headwheel at the normal rate of rotation.
2. Running the tape at a linear speed of 1/x the normal tape speed, where x is a positive integer.
3. Reading data whenever the heads pass over the tape.
4. Aligning the head location of the pair of co-located heads with one of the tracks of a first azimuth recorded on the tape.
5. Selecting data from the first head for inclusion in the reduced rate bit stream, while ignoring data read from the tape by the second head.
6. Ignoring data read from the tape during the next (x−1) rotations of the headwheel.
7. Selecting data read from the tape by the second head for inclusion in the reduced data rate bit stream, while ignoring data read from the tape by the first head.
8. Ignoring data read from the tape for the next (x−1) rotations of the headwheel.
9. Repeating steps 5 through 8.

A fourth method for reading data which will now be referred to as playback method four, can be used with a digital VTR that has a headwheel having H head locations located on the headwheel 360/H degrees apart, where each of the odd numbered head locations contains a pair of co-located heads including a first head of a first azimuth and a second head of a second azimuth, and each of the even numbered locations includes a head of the first azimuth.

Playback method four of the present invention is a method for reading pre-recorded data at a data rate of 1/x the full playback data rate, where x is a positive integer. Playback method four of the present invention can be described, as comprising the steps of:

1. Rotating the headwheel at the preselected rate of rotation.
2. Moving the tape around the headwheel at a linear speed of 1/x the preselected standard play tape speed.
3. Aligning the heads and tape such that a one of the odd numbered head locations is aligned with a tape track of the second azimuth.
4. Reading prerecorded data from the tape whenever any of the H head locations pass over the tape.
5. Commencing to select data read from the second head of the one of the odd numbered head locations for inclusion in the reduced rate data stream and excluding data read by the first head of the one of the odd numbered head locations from the reduced rate data stream while the one of the odd numbered head locations passes over the tape.
6. Continuing to rotate the headwheel 360(x−1)/H degrees from the point selection of data for inclusion in the reduced rate data stream was last commenced, while excluding from the reduced rate data stream data read by any of the H head locations that begin to pass over the tape while the headwheel rotates the 360(x−1)/H degrees.
7. Continuing to rotate the headwheel at the preselected rate of rotation to pass a next one of the H head locations located 360x/H degrees from the head location that contains the head that read the data that was last selected for inclusion in the reduced rate data stream.
8. Commencing to select data read by a head of a differing azimuth from the azimuth of the head whose data was last selected for inclusion in the reduced rate data stream, located at the next one of the H head locations, and continuing to select the data from the head of a differing azimuth while the next one of the H head locations completes the pass over the tape;
9. Repeating steps 6 through 8.

In general terms, method four may be described as comprising the following steps:

1. Rotating the headwheel at the normal rate of rotation.
2. Running the tape at a linear speed of 1/x the normal tape speed, where x is any positive integer.
3. Aligning the heads and tape such that if at least one of the head locations contains a single head a one of the co-located heads that is located adjacent to the single head is aligned with a track on the tape having an azimuth opposite that of the adjacent single head, or if all head locations contain co-located heads align one of the co-located heads with a track on the tape having an arbitrary azimuth.
4. Selecting data from the head aligned with the track for inclusion in the reduced rate bit stream.
5. Ignoring data read from the tape by the heads located at the next (x−1) head locations to pass over the tape.
6. Selecting data read by the head having an azimuth opposite the azimuth of the head that read the data last included in the reduced rate data stream, located at the next head location to pass over the tape for inclusion in the reduced data rate bit stream.
7. Repeating steps 5 and 6.

Another method for reading data which will now be referred to as playback method 5a, can be used with a digital VTR that has a series of H heads of alternating azimuths, where each of the H heads are centered one track width apart from each other and the series of H heads is located at a single location on the headwheel.

Playback method 5a of the present invention is a method for reading pre-recorded data at a data rate of (2m/H) times the data rate of the full data rate, where m is a positive integer between 1 and H/2, and where H is an even positive integer. Playback method 5a of the present invention can be described, as comprising the steps of:

1. Moving the tape around the heedwheel at a linear speed of 2m/H times the preselected standard play tape speed.
2. Rotating the headwheel at the preselected rate of rotation, each of the H heads in the series of H heads passing over the moving tape on a diagonal relative to the length of the tape once during each complete 360 degree revolution of the headwheel.
3. Aligning a one of the H heads with one of the pre-recorded tracks on the tape such that the one of the H heads is aligned with a pre-recorded track on the tape of the same azimuth as the one of the H heads.
4. Reading pre-recorded data from the tape whenever one of the H heads passes over the tape.
5. Continuing to rotate the headwheel at the preselected rate to pass the series of H heads over the tape.
6. Commencing to select data read from the tape by a set of 2m adjacent heads of the series of H heads, as the series of H heads begins to pass over the tape, for inclusion in the reduced rate data stream, and continuing to select, for inclusion in the reduced rate data stream, data read by the set of the 2m adjacent heads while the set of 2m adjacent heads continues to pass over the tape.
7. Excluding data, read from the tape by the (H−2m) heads of the series of H heads not included in the set of 2m adjacent heads, from the reduced rate data stream.

8. Continuing to rotate the headwheel at the preselected rate of rotation to pass the series of H heads over the tape.
9. Commencing to select data, for inclusion in the reduced rate data stream, read from the tape by the set of 2m adjacent heads, as the series of H heads begins to pass over the tape, and continuing to select, for inclusion in the reduced rate data stream, data read by the set of the 2m adjacent heads while the set of 2m adjacent heads continues to pass over the tape.
10. Excluding data read from the tape by the (H−2m) heads of the set of H heads not included in the set of 2m adjacent heads from the reduced rate data stream.
11. Repeating steps 8 through 10.

In general terms, playback method 5a may be described as comprising the following steps:
1. Rotating a headwheel at the normal rate of rotation.
2. Running the tape at a linear speed of 2m/H times the normal tape speed, wherein H is a positive integer representing the number of heads located at a location on the headwheel and m is a positive integer between 1 and H/2.
3. Aligning the heads and tape such that the heads are aligned with with tracks of the same azimuths.
4. Reading data with all of the H heads.
5. Selecting data, read by 2m adjacent heads on each pass of the heads over the tape for inclusion in the reduced rate data stream.

Another method for reading data which will now be referred to as playback method 5b, can be used with a digital VTR that has a series of H heads of alternating azimuths, where each of the H heads are centered one track width apart from each other and the series of H heads is located at a single location on a headwheel.

Playback method 5b of the present invention is a method for reading pre-recorded data at a data rate of (1/p) times the full playback data rate, where p and H are positive integers. Playback method 5b of the present invention can be described, as comprising the steps of:
1. Moving the tape around the heedwheel at a linear speed of 1/p times the preselected standard play tape speed, where p is a positive integer.
2. Rotating the headwheel at the preselected rate of rotation, each of the H heads in the series of H heads passing over the moving tape on a diagonal relative to the length of the tape once during each complete 360 degree revolution of the headwheel.
3. Aligning a one of the H heads with one of the pre-recorded tracks on the tape such that the one of the H heads is aligned with a pre-recorded track on the tape of the same azimuth as the one of the H heads.
4. Reading pre-recorded data from the tape whenever a head passes over the tape.
5. Passing the series of H heads over the tape by continuing to rotate the headwheel at the preselected rate of headwheel rotation.
6. Selecting data, for inclusion in the reduced rate data stream, read from the tape by the heads in the series of H heads when the series of H heads passes over the tape.
7. Passing the series of H heads over the tape (p−1) times by continuing to rotate the headwheel at the preselected rate of headwheel rotation.
8. Excluding the data read from the tape by the heads in the series of H heads, as the series of H heads passes over the tape the (p−1) times from the reduced rate data stream.
9. Passing the series of H heads over the tape for a $p^{th}$ time by continuing to rotate the headwheel at the preselected rate.
10. Selecting data, for inclusion in the reduced rate data stream, read from the tape by the heads in the series of H heads when the series of H heads pass over the tape for the $p^{th}$ time.
11. Repeating steps 7 through 10.

In general terms, playback method 5b may be described as comprising the following steps:
1. Rotating the headwheel at the normal rate of rotation.
2. Running the tape at a linear speed of 1/p the normal tape speed, where p is a positive integer.
3. Aligning the heads and tape such that the heads are aligned with tracks of the same azimuths.
4. Selecting data from the heads for inclusion in the reduced rate data stream.
5. Ignoring data read from the tape for the next (p−1) rotations of the headwheel.
6. Repeating steps 4 and 5.

Referring again to the drawings, and to FIG. 6 in particular, there is illustrated a digital VTR recording circuit according to the present invention, generally indicated by the reference numeral 10. The VTR recording circuit 10 comprises an antenna 12, a tuner 14, an long play data processing circuit 16, a first switch 18, a data shuffling and framing circuit 22, and a tape speed motor control unit 24. In addition, the VTR recording circuit comprises a set of heads 26, and a pair of tape spindle wheels 30. The set of heads 26 are mounted on a headwheel and may be of any of the previously described headwheel arrangements illustrated in FIGS. 1–4. A tape 28 is illustrated as passing around the heads 26 and between the pair of tape spindle wheels 30.

The VTR recording circuit 10 receives a full rate video signal comprising both video and audio information via the antenna 12. The antenna 12 is coupled to the input of the tuner 14. In this manner the tuner 14 is supplied with the analog video signal. The tuner 14 may include an analog to digital converter in addition to other circuitry for converting the analog video signal to a digital video/audio data bit stream comprising encoded video and audio data, e.g., video transport data packets wherein each data packet may contain variable length encoded video codewords.

An audio/video data stream output of the tuner 14 is coupled to a first input of the switch 18 and a corresponding input of the long play data processing circuit 16. The long play data processing circuit 16 receives the audio/video data bit stream output by the tuner 14 and processes the data stream in accordance with one of the three data reduction methods of the present invention to generate a reduced rate bit stream.

The long play data processing circuit 16 comprises a syntax parser 42 that receives the video/audio data stream output by the tuner 14 via the input of the long play data processing circuit 16. In addition to the syntax parser 42, the long play data processing circuit 16 comprises a variable length decoder circuit 44, a requantizer circuit 46, a quantization scale factor reduction circuit 50, and a syntax reconstruction circuit 48.

The syntax parser 42 receives the video/audio data bit stream from the tuner and parses the received bit stream to generate a quantization scale factor signal indicative of the quantization scale of the received bit stream and further parses the bit stream to generate a parsed video data bit stream.

A parsed video data bit stream output of the syntax parser 42 is coupled to a corresponding input of the variable length decoder 44. The variable length decoder 44 decodes the parsed variable length encoded video bit stream into a stream of codewords. The codeword output of the variable length decoder 44 is coupled to a corresponding input of the requantizer circuit 46.

As illustrated in FIG. 6, the long play data processing circuit may include a data selection circuit 45 for prioritizing and selecting data from the full rate bit stream to be incorporated into the reduced rate bit stream. The data selection circuit 45 may be used in place of the requantization scale factor circuit 50 and requantization circuit 46. Alternatively, it may be used in conjunction with these circuits. In such an embodiment, the data selection circuit 45 would be located between the variable length decoder 44 and requantizer circuit 46.

The quantization scale factor reduction circuit 50 receives the quantization scale factor generated by the syntax parser 42 as an input signal and generates a first and second output signal therefrom. A first signal output of the quantization scale factor reduction circuit 50 is coupled to the input of the requantizer circuit 46 while a second signal output is coupled to an input of the Syntax reconstruction circuit 48. The quantization reduction circuit 50 stores information indicating how much the quantized scale factor of the received bit stream must be adjusted to achieve, through requantization, the amount of data reduction needed to generate the reduced rate bit stream.

The requantizer circuit 46 generates in response to the first signal output by the quantization reduction circuit 50, a reduced rate video data codeword stream that is supplied to a corresponding input of the syntax reconstruction circuit 48. The syntax reconstruction control circuit 48 receives the requantized video codeword data stream from the requantizer circuit 46 and a quantization scale factor control signal from the quantization scale factor reduction circuit 50. The syntax reconstruction circuit 48 processes the received video codeword data stream to generate a video/audio data bit stream that complies with the syntax constraints of the data format supported by the digital VTR recording circuit 10. The requantized and reconstructed video/audio data bit stream is supplied to the second input of the first switch 18.

The VTR command generator 20 receives, at a user command input, user commands which indicate, e.g., the VTR speed mode of operation a user has selected for VTR operation, for example, standard or long play modes of operation. These user commands may be input through, e.g., a VTR control panel that is coupled to the VTR command generator 20. The VTR command generator generates VTR control signals that are used to control the VTR speed mode of operation. The control signal output of the VTR command generator 20 is coupled to a control signal input of the switch 18, the tape speed motor control unit 24, and a recording mode signal input of a recording control circuit 37.

As will be described below, the recording control circuit 37 receives the signal output by the VTR command generator 20 and the data from the full or reduced rate bit stream that is to be recorded on the tape. The recording control circuit 37 is responsive to the signal output by the VTR command generator to supply the set of heads 26 with the data to be recorded on the tape and to control the heads to record the data in accordance with one of the above described recording methods when the signal received from the VTR command generator indicates the VTR recording circuit is operating in long play mode. Accordingly, the set of heads 26 are coupled to and controlled by the recording control circuit 37 to record data at the appropriate time as a function of the VTR mode of operation. Thus, for example, during long play mode operation, only some of the heads comprising the set of heads 26 may be used for recording data while all of the heads comprising the set of heads 26 may be used during standard play recording operation.

The switch 18 is responsive to the control signals received from the VTR command generator circuit 20 to couple either the normal play video data bit stream received at its first input or the long play video/audio data bit stream received at its second input to the input of the data shuffling and framing circuit 22. In this manner, VTR command generator 20, in response to user commands, controls whether the full rate normal play video bit stream or the reduced rate long play video data bit stream is supplied to the data shuffling and framing circuit 22 for recording on the tape 28.

The data shuffling and framing circuit 22 comprises a VTR framing and ECC circuit 40 and a data shuffling circuit 38. The input of the VTR framing and error correction code ("ECC") circuit 40 is coupled to the output of the switch 18. In this manner, the VTR framing and ECC circuit 40 receives the selected standard or long play video/audio data bit stream which it arranges into a series of video data blocks which contain error correction coding in addition to video and/or audio data.

A video data block output of the VTR framing and ECC circuit 40 is coupled to a corresponding input of the data shuffling circuit 38. The data shuffling circuit 38 reorders, i.e., shuffles, the video data blocks received from the VTR framing and ECC circuit 40 prior to recording on the video tape. The output of the data shuffling circuit 38 is coupled to a data input of the recording control circuit 37. The recording control circuit 37 is, in turn, coupled to the set of helical scan heads 26 which are mounted on a headwheel. During VTR recording operation, the set of heads 26 are controlled by the recording control circuit 37 to record the video data blocks output by the data shuffling circuit 38 on the tape 28 in accordance with one of the above described recording methods.

The VTR recording circuit's tape speed motor control unit 24 contains a plurality of tape speed motor control circuits with a separate tape speed motor control circuit being provided for each tape speed supported by the VTR recording circuit. Thus, the tape speed motor control unit 24 contains K tape speed motor control circuits where k represents the number of normal play modes of VTR operation supported by the VTR recording circuit. In the illustrated embodiment, the VTR recording circuit supports two tape speed modes of operation, i.e., standard play and long play. Accordingly, the tape speed motor control unit 24 comprises a normal play tape speed motor control circuit 34 and a long play tape speed motor control circuit 36.

The tape speed motor control unit 24 further comprises a switch 32 for coupling the output of either the normal play tape speed motor control circuit 34 or the long play tape speed motor control unit 36 to the tape spindle wheels 30. The switch 32 has a control signal input coupled to the output of the VTR command generator 20. Upon receiving a command signal indicating that the VTR is in normal play recording mode, the switch 32 couples the normal play tape speed motor control circuit 34 to the tape spindle wheels 30. In this manner, during normal play recording operation, the normal play tape speed motor control circuit 34 controls the speed of the tape spindles 30 and thus corresponding speed at which the tape moves around the heads 26. However, during long play operation, the switch 32 will couple the output of the long play tape speed motor control unit 36 to the tape spindles 30. Accordingly, during long play recording operation, the speed of the tape spindles 30 will be controlled to move the tape at the speed appropriate for long play operation which will generally be some fraction of the normal play tape speed.

Figure 7:
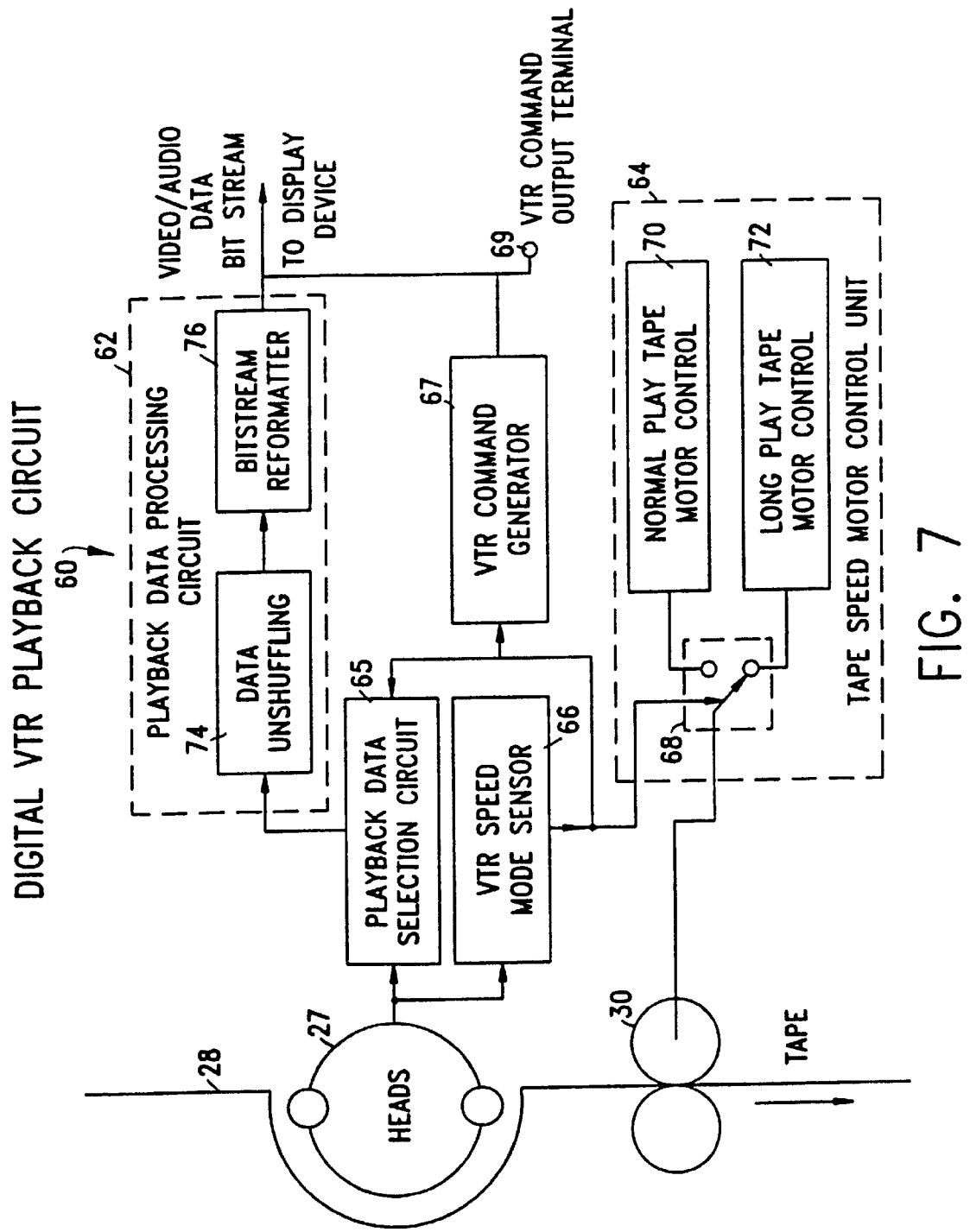
FIG. 7 is an exemplary schematic block diagram of a VTR playback circuit according to the present invention.

Referring now to FIG. 7, there is illustrated a digital VTR playback circuit according to the present invention generally indicated by the reference numeral 60. The VTR playback circuit 60 comprises a playback data processing circuit 62, a VTR speed mode sensor 66, a VTR tape speed motor control unit 64, tape spindles 30 and a set of helical scan read heads 27. These heads 27 may be arranged in a variety of ways, e.g., as illustrated in FIGS. 1–4 and FIG. 8. As illustrated in FIG. 7, during playback operation, the tape 28 passes around the read heads 27 and between the tape spindles 30 as a result of the rotation of the tape spindles 30.

The read heads 27 are coupled to the input of the playback data processing circuit 62 and the VTR speed mode sensor 66. By reading the data recorded on the tape 28 the read heads 27 generate a video data stream that is supplied to the input of the playback data processing circuit 62 and to the input of the VTR speed mode sensor 66 for processing. The VTR speed mode sensor 66 analyzes the data read from the tape to determine what particular speed mode of digital VTR operation, e.g., standard mode or long play mode of operation, the data is intended to be played back at. The VTR speed mode sensor may determine the correct speed mode from, e.g., a speed mode indicator recorded on the tape along with the video data or by analyzing the data to determine if the recorded data contains less information for a series of video frames than would be recorded if normal speed VTR operation was the intended mode of VTR operation.

The VTR speed sensor 66 has a VTR speed mode signal output coupled to a control input of the tape speed motor control unit 64, a VTR data processing command generator circuit 67, and a control circuit input of the heads 27. The VTR speed mode signal output may also be coupled to various other circuits within the VTR that require information concerning the VTR speed mode of operation, e.g., the playback data processing circuit 62.

The VTR command generator determines the mode in which the VTR is operating from the VTR speed mode signal. During long play mode operation the VTR command generator generates a signal indicating that the VTR is operating in long play mode. It may also generate commands instructing the receiver to perform video data processing on the data received during long play mode VTR operation to enhance the quality of the images generated by the receiver. The output of the VTR command generator 67 is coupled to a VTR command output terminal and/or the video/audio data bit stream output of the playback data processing circuit 62. Accordingly, a receiver coupled to the digital VTR playback circuit 62 of the present invention can receive a VTR mode signal and/or commands output by the VTR command generator 67 from either the video/audio data bit stream or from the VTR command output terminal 69.

The playback data selection circuit 65 is coupled to the outputs of both the set of heads 27 and the VTR speed mode sensor 66. Using the signal received from the VTR speed mode sensor 66, and information stored in the playback data selection circuit 65 concerning which of the heads that comprise the set of heads 27 are used during each mode of VTR operation supported by the VTR playback circuit 60, the playback data selection circuit 65 selects which heads will be used to supply data to the playback data processing circuit 62 at any given time.

The tape speed motor control unit 64 comprises a switch 68 and a series of k tape speed motor control circuits, where k corresponds to the number of normal play modes of operation supported by the VTR playback circuit 60 and wherein each tape speed motor control unit controls the tape spindle speed during a different VTR speed mode of operation. For example, in the embodiment illustrated in FIG. 2, the tape speed motor control unit 64 comprises a normal play tape speed motor control circuit 70 and a long play tape speed motor control unit 72.

The switch 68 has a first input terminal coupled to the output of the normal play tape speed motor control circuit 70 and a second input terminal coupled to the output of the long play tape speed motor control unit 72. In addition, the output of the VTR speed mode sensor 66 is coupled to a control input of the switch 68.

The switch 68 is responsive to the signal output by the VTR speed mode sensor 66 couples the output of the appropriate one of the tape speed motor control circuits 70, 72 to the tape spindles 30 so that the tape spindles 30 are controlled to rotate at a speed that will move the tape 28 at the proper speed for reading data from the tape 28.

The playback data processing circuit 62 comprises a data unshuffling circuit 74 and a bit stream reformatter circuit 76. The output of the set of read heads 27 is coupled to the input of the data unshuffling circuit 74. The data unshuffling circuit in turn has an output coupled to the input of the bit stream reformatter circuit 76. The data unshuffling circuit 74 receives the data read from the tape 28 and unshuffles the data blocks which are then supplied to the bit stream reformatter 76. The bit stream reformatter uses the ECC bits adapted by the VTR framing and ECC circuit at recording time 40 to correct error that occurred during the recording and reading of the data and also converts the blocks of data into a video/audio data bit stream format that can be readily processed and displayed by a display device, e.g., a video monitor or television set.

Generally, the VTR playback circuit of the present invention functions in a conventional manner during standard playback modes of operation. That is, the tape 28 is moved around a portion of the headwheel upon which the set of read heads 27 are mounted at the normal play tape speed with the tracks on the tape being aligned with the rotating heads 27 using a conventional servo mechanism. Data read from the tape 28, using the set of read heads 27, is supplied to the playback data processing circuit 60.

During long play modes of playback operation, the VTR speed mode sensor 66 determines the particular long play mode of operation supported by the playback circuit 60 that corresponds to the mode the data on the tape is intended to support. The appropriate long play tape motor control 72 is then selected by the VTR speed mode sensor 66 to control the speed of the tape spindles 30 and thus the speed of the tape 28 such that the tape will move at the appropriate speed which is some fraction of the normal play tape speed.

Because the playback data selection circuit 65 is informed by the speed mode sensor of the long play mode in which the VTR is operating, it is able to determine which of the heads that comprise the set of heads 27 should be used to read back the recorded data.

A conventional servo mechanism is used to align the recorded tracks on the tape 28 with the heads in the set of heads 27 that the playback data selection circuit 65 determines are to be used to read back the reduced rate data stream recorded on the tape 28.

The set of read heads 27, may comprise, e.g., a plurality of read heads arranged as illustrated in any of FIGS. 1–4 and FIG. 8. The methods of the present invention for reading reduced rate bit streams recorded on a tape for each of the head arrangements illustrated in FIGS. 1–4 and 8 are described above in greater detail.

The data recording and reduction methods described above can be used to support one or more LP recording modes for recording HDTV and SDTV signals. In addition, they can be used to implement a digital VTR capable of recording a HDTV signal and/or a SDTV signal. In such a case, if the HDTV signal and SDTV signal were fixed rate signals, the VTR of the present invention would record the HDTV signal as a full rate signal and the SDTV signal as a reduced rate signal but without performing any data reduction on the SDTV signal. HDTV and SDTV long play modes of operation may also be supported by performing data reduction on the signals before recording.

As discussed above, it is expected that SDTV signals, which are likely to have a maximum instantaneous data rate lower than the data rate of a fixed rate HDTV signal, may have variable transmission data rates. In the case where a received signal is a variable rate signal, the received signal should be converted to a fixed rate signal prior to recording since recording is performed at a fixed rate.

Various methods can be used to convert a SDTV signal to a fixed rate signal for example, buffering over long periods of time to smooth changes in the data rate may be used prior to recording. However, such an approach has the drawback of requiring relatively large data buffers which may be expensive to implement because of the current cost of memory.

Another approach to recording a variable rate SDTV signal is to use a VTR which has a recording rate that matches or exceeds the maximum instantaneous data rate and to pad the received data to insure that the recorded data rate will be constant and equal to the recording rate of the VTR. Such an approach has the drawback of wasting recording tape in the sense that filler data is recorded on the tape. However, this approach is relatively easy to implement. In the case of HDTV VTRs where the recording rate of the VTR is designed to match the HDTV data rate, the VTRs recording rate will equal or exceed the maximum instantaneous data rate of an SDTV signal.

Accordingly, it is possible to record SDTV signals having a fixed or variable transmission data rate using a HDTV VTR by padding the received data to bring the rate of the received data plus the padded data upto the recording rate of the HDTV VTR. However, as discussed above, such an approach while being easy to implement can result in the wastage of substantial amounts of video tape.

Various approaches of the present invention to converting a variable rate data signal to a fixed rate data signal suitable for recording on a tape by a VTR will now be discussed with reference to FIG. 9.

Figure 9:
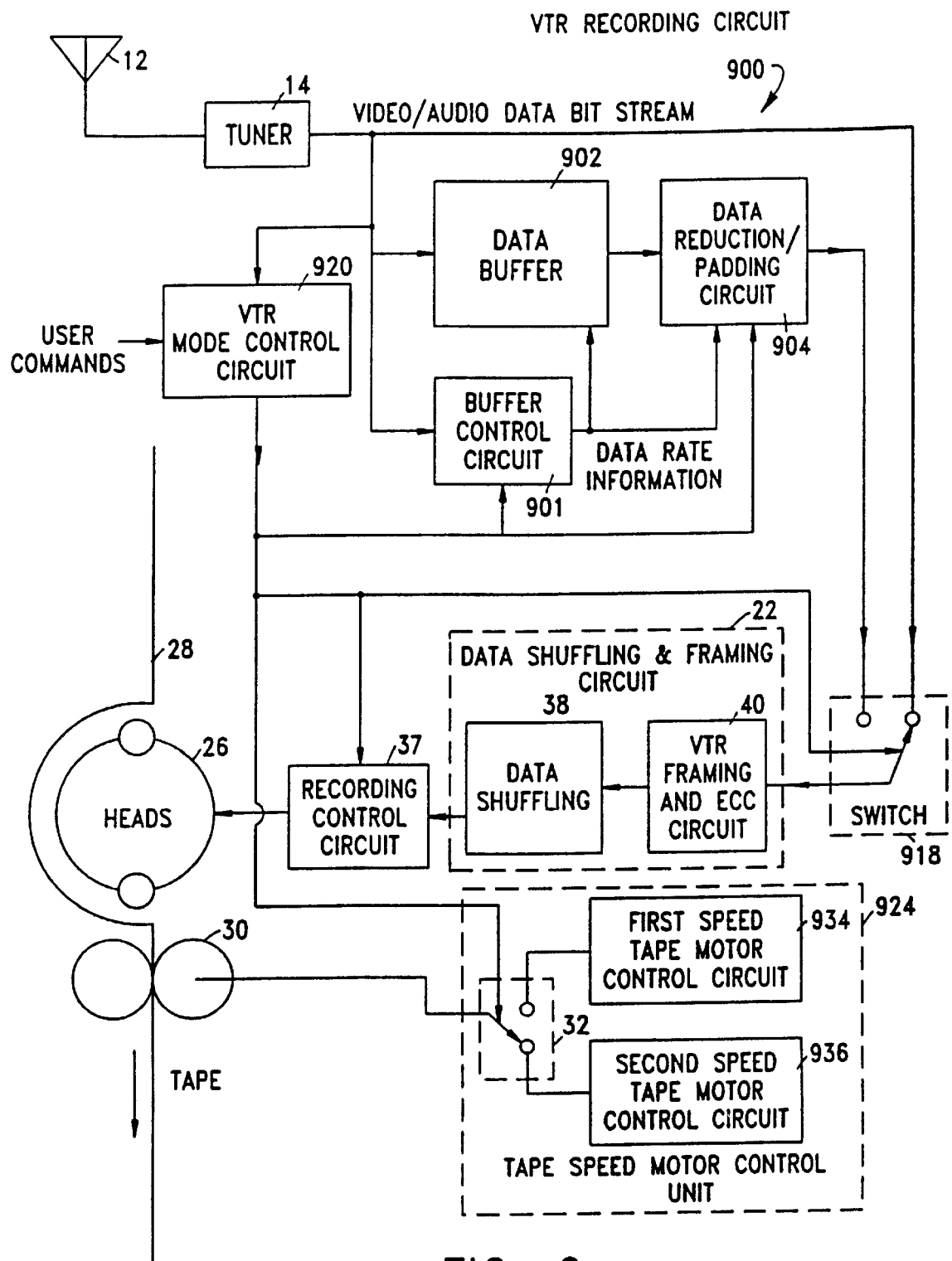
FIG. 9 is an exemplary schematic block diagram of a VTR recording circuit of the present invention capable of recording HDTV signals and/or SDTV signals.

Referring now to FIG. 9, there is illustrated a VTR recording circuit 900 capable of recording SDTV signals, e.g., transmitted at a variable data rate, and/or a HDTV signal. The VTR recording circuit 900 illustrated in FIG. 9, contains many elements that are the same as or similar to the elements of the recording circuit illustrated in FIG. 6. Elements that are the same or similar are numbered the same in both FIGS. 6 and 9 and will not be described again in detail.

As illustrated in FIG. 9, the output of the tuner 14 is coupled to an input of a VTR mode control circuit 920, a buffer control circuit 901, a data buffer 902, and a second input of a switch 918. In this manner, the video/audio data bit stream output by the tuner is supplied to each of the elements coupled thereto.

The buffer control circuit 901 monitors the rate of the data supplied to the data buffer 902 and generates a data rate information signal which is used to control the data buffer output rate and the operation of the data reduction/padding circuit 904.

The data buffer 902, as will be discussed below, is used to temporally store the received signal, e.g., SDTV data, so that the rate of the received data video/audio data bit stream can be determined and controlled.

A data output of the data buffer 902 is coupled to the input of a data reduction/padding circuit 904. The data rate reduction/padding circuit 904 uses the data rate information received from the buffer control circuit 901 to generate a fixed rate data stream from the received video/audio data bit stream which may be of a variable data rate. A fixed rate data output of the data reduction circuit 904 is coupled to the first input of the switch 918. When multiple recording rates less than the maximum data rate are supported by the VTR recording circuit 900, a mode control signal is supplied to the data reduction circuit 904 from the VTR mode control circuit 920 so that the data reduction circuit is informed as to the mode the VTR is operating in so that it can control the data rate to be the fixed rate at which data is to be recorded during the particular mode of VTR operation.

In one embodiment of the present invention, rather than use a switch 918 as illustrated in FIG. 9, both HDTV and SDTV received data is passed through the data buffer 902 and data reduction/padding circuit 904. In such an embodiment, the data reduction/padding circuit merely passes fixed rate HDTV data but processes SDTV data, e.g., to generate a fixed rate data stream therefrom.

The VTR mode control circuit 920 receives user commands, indicating, e.g., that the VTR should operate in a particular mode of operation, e.g., one of a plurality of long play modes of operation. In addition, the user commands may be used to instruct the VTR to operate in either a HDTV recording mode or a SDTV recording mode of operation.

Alternatively, the VTR mode control circuit receives the video/audio bitstream output by the tuner 14 and monitors it to determine which mode of VTR operation is most appropriate to record the received bitstream, e.g., is selects the VTR mode of operation dynamically as a function of the rate of the received video/audio data bitstream.

The VTR mode control circuit 920 generates control signals which are supplied to the switches 918 and 32 to insure that they are placed in the correct position for the selected mode of VTR operation. It also supplies control signals to the buffer control circuit 901 and data reduction/padding circuit 904 to control them to operate in the selected mode of VTR operation. For example, when data is being received at a variable data rate indicative of an SDTV data rate, the VTR mode control circuit 930 may control the data buffer 902 and data reduction/padding circuit 904 to output the received data at a fixed rate that corresponds to a recording rate that is supported by the VTR recording circuit 900 but that is less than the recording circuit's maximum recording rate which is used, e.g., to record HDTV data.

With regard to the control of the switch 918, when the VTR mode control circuit 920 receives a command instructing it to operate in HDTV mode or selects that a HDTV VTR recording mode is the appropriate mode of operation, it controls the switch 918 to couple the output of the tuner directly to the input of the data shuffling and framing circuit 22 thereby bypassing the data reduction circuit 904. In SDTV mode, on the other hand, the VTR mode control circuit controls the switch 918 so that the output of the data reduction circuit 904 is coupled to the input of the data shuffling and framing circuit 22.

Similarly, the VTR mode control circuit 920 operates to control the position of the switch 32 to couple the output of the tape speed motor control unit 924 to a second speed tape motor control circuit 936 during HDTV operation and to a first speed tape motor control circuit 934 during SDTV mode operation.

While not shown in FIG. 9, the tape speed motor control unit may contain additional tape speed motor control circuits to support one or more modes of LP operation in addition to first and second recording modes of operation corresponding to a HDTV recoding mode and a SDTV recording mode. In such an embodiment, the VTR mode control circuit is used to control the switch 32 so that the correct tape speed motor control circuit is used to control the speed to the spindles 30.

As discussed above, in one embodiment of the present invention, the VTR mode control circuit 920 automaticly determines whether the VTR is operating in SDTV mode or HDTV mode based on the data it receives from the tuner. For example, the VTR mode control circuit 920 can measure the rate at which the data is output by the tuner. Alternatively, the VTR mode control circuit 920 may monitor headers included in the data output by the tuner, i.e. headers in the transmitted data, for header information indicating that the data rate will not exceed a particular maximum data rate. Such header information may be included in the SD and/or HDTV data and can be used by the VTR mode control circuit 920 to determine which mode of VTR recording operation should be used.

In the embodiment where an actual measurement of the data rate of the received signal is used to determine which recording mode is to be used, if the data rate of the received signal exceeds a predetermined threshold, e.g., which equals or exceeds the maximum instantaneous data rate of an SDTV signal for a preselected period of time, the VTR mode control circuit 920 determines that the VTR is operating in HDTV modes and controls the switches 918, 32 accordingly. Otherwise, the VTR mode control circuit operates in SDTV mode or another LP mode of operation. In such an embodiment, user commands may be used to override the automatic selection of a mode of VTR operation to select a HDTV or SDTV long play mode of operation.

Methods of using the VTR recording circuit 900, of the present invention, to record received data having a variable rate, will now be described.

In the case of fixed bit rate MPEG transmission, e.g., fixed rate HDTV signals, the bit rate is fixed for an entire sequence, and, in accordance with MPEG-2, the bit rate is transmitted as part of the sequence header information contained in the transmitted data stream. When the various above described data reduction methods are applied to fixed rate transmissions, the input and desired data rates are known so that the amount of data reduction is also known. For example, the amount of data reduction which must be performed on a received data stream is known because the received signal has a known fixed data rate and the particular recording mode of operation being used is known to support a fixed recording rate with the difference in the received data rate and the recording rate being the amount of data reduction that must be performed assuming that little additional header or ECC information is added to the data being recorded.

However, as discussed above, MPEG also allows for variable bit rate data transmissions which may be used for, e.g., the is transmission of SDTV signals. In variable bit rate mode, the bit rate is not transmitted and the bit rate of an MPEG signal is permitted to change instantaneously.

In accordance with the present invention, before applying data reduction methods to a received signal the data rate of the input signal, e.g., the signal output by the tuner 14, is calculated or estimated over a preselected time period to determine the amount of data reduction required to support a selected recording mode of VTR operation, i.e., a recording mode having a fixed recording data rate.

In accordance with the present invention, the average bit rate of a received signal, for a preselected period of time, is calculated using the data buffer 902 to temporarily store the received data.

One method of the present invention for calculating the average bit rate of a received signal over a period of time uses the program clock reference signal present in the system layer of an MPEG-2 compliant signal to set the period of time over which the bit rate is calculated. However, other clock signals and time periods may be used in accordance with the present invention to determine the bit rate of a received signal. The program clock reference signal is a signal which is incorporated into a video data signal being transmitted at fixed intervals, e.g., every 100 milliseconds. The data rate is determined by buffering the data received in the program clock reference signal period, and measuring the amount of data received. The data rate is then determined as the amount of data received divided by the period of the program clock reference signal.

Once the bit rate of a received signal is known for a given time period as a result of the buffering and data rate measurement operation, the buffered data, now having a known bit rate, is processed for recording on a tape by the data reduction circuit 904. The data reduction circuit 904 is responsible for converting the buffered data into a fixed rate signal having a data rate equal to the recording rate of the selected mode of VTR operation. The data reduction circuit 904 performs data reduction, e.g., using one of the data reduction techniques described above, or data padding, to achieve the desired fixed output data rate.

In the described embodiment where received data is buffered for the duration of time in which the received data rate is being measured, the data buffer 902 should be made large enough to store the maximum number of bits that may be transmitted during the preselected period of time in which the bit rate is being measured. Thus, the size of the data buffer 902, in such an embodiment, should be large enough to store the maximum input bit rate permitted by the transmission standard times the preselected period of time the data is being buffered for measurement of the bit rate. In such an embodiment, a new bit rate is determined for each of the preselected data rate measurement time periods and the amount of data reduction and/or padding performed by the data reduction/padding circuit 904 is dynamically changed for the data received in each preselected time period.

As an alternative to the above described embodiment in which the data buffer 902 is used to store the data received in the preselected time period before it is emptied, the data buffer 902 can be filled at the unknown input rate of the received bitstream and simultaneously emptied at a known rate, e.g., a rate lower than or equal to the minimum anticipated data rate of an SDTV signal. Such an embodiment has the advantage of reducing the size of the required buffer as compared to the embodiment where the buffer is not emptied until the end of the preselected time period.

In such an embodiment where the data buffer 902 is emptied at a known rate, to prevent underflow, the data buffer 902 is allowed to initially fill for a preselected period of time before data is emptied out at the known rate in order to prevent underflow in the case that the instantaneous input rate is below the output rate. The preselected time used to initially fill the data buffer 902 should be long enough such that the data buffer 902 will be filled with at least as much data as the difference between the output rate and the minimum input rate times the input data rate measurement time period.

In order to prevent data buffer overflow, the data buffer 902 should be sized such that the space remaining in the data buffer 902 after it is initially filed is the difference between the maximum data rate of the received signal and the known output data rate times the preselected measurement time period less the time period.

Note that in the case of unconstrained MPEG-2 where there are no instantaneous minimum and maximum defined data rates, i.e., where the bit rate of the transmitted signal can be zero for an indefinite time, to guarantee that buffer underflow will not occur it is necessary to buffer the received data for the entire preselected period of time.

In order to reduce buffering requirements, as an alternative to using the actual measured data rate of the received signal for a preselected time period, an estimate of the data rate for a given time period could be used to control the data reduction/padding circuit 902. One option is to measure the data rate of the previously arrived time period and to then use this as the estimate of the current data rate. More complicated estimation techniques might also be used to take into account any known dynamics of the bit stream being received as well as previous data rate values. The use of Kalman filtering offers one method capable of taking into account several of these factors. Classical prediction algorithms can also be applied to predict the received data rate. By using predicted values as opposed to actual data rate values to control the operation of the data reduction/buffering circuit 904, data buffering requirements associated with measuring the actual data rate can be minimized.

In the case where the actual data rate, i.e., bit rate, for a preselected time period is calculated, e.g., using the buffering processes described above, the bit rate of the signal output by the tuner 14 for a preselected time period can be represented by the variable RP(t) while the recording rate of the selected VTR mode of operation can be represented by the symbol RR. If RP(t)<RR the data reduction/padding circuit can generate an output data stream for recording on the tape having a bit rate RR by simply adding padding data to the received data. However, if RP(t)>RR the data reduction/padding circuit 902 must perform some either a data rate reduction or a data rate smoothing operation to generate an output signal having a fixed data rate equal to RR. Data rate reduction may be performed by the data reduction/padding circuit 902 using any one of the numerous above described data rate reduction techniques.

In accordance with one embodiment of the present invention, where the data buffer 902 acts as a constant delay in which the data rate is calculated for the preselected time period, for any preselected time period in which RP(t)>RR, the data received in the time period t is reduced using data reduction methods to the amount (RR * the preselected time period) so that the fixed output data rate of the data reduction and padding circuit 904 is RR. In any time period t where RP<=RR, no data reduction is performed.

In order to support the above described embodiment, a buffer having a size $RP_{max}*T$, where T is the preselected time period over which the data rate RP is measured, is required. As a result, longer measurement time periods, T, require the use of a larger data buffer 902 than is required by the use of smaller measurement time periods. While longer data rate measurement time periods result in increased buffer requirements, the longer buffering periods have the advantage of reducing the overall data rate variations between time periods because brief variations in the data rate are less likely to have a substantial impact on the data rate measured over a long time period. This decrease in the data rate differences between time periods is likely to result in less data rate reduction and hence better picture quality.

Because the data rate tends to vary greatly for different frames within an MPEG Group-of-Pictures ("GOP"), and tends to vary less between consecutive complete GOPs, it is desirable for the size of the data buffer 902 to be at least as large as a GOP. For example, if S=15, where S represents the number of frames in a GOP, and the maximum input data rate is 12 Mbps the data buffer size should be at least 6 MBits assuming an input rate of 30 frames/second so that the data buffer 902 can store an entire GOP.

While the above described method of generating a fixed rate bitstream for recording on a tape should produce satisfactory effects, in order to reduce the amount of data that is lost as a result of data reduction and to thereby increase picture quality, in one embodiment of the present invention, the data buffer 902 under control of the buffer control circuit 901 serves as a data rate smoother. This is accomplished by varying the delay through the buffer without varying the preselected time period in which the data rate is calculated. In such an embodiment, the output rate RO(t) of the data buffer 902 is permitted to vary from the data rate RP(t) of the received signal. Data from different periods is shared to decrease the variations in the output rate RO(t) so that less data reduction is required thereby resulting in improved image quality as compared to the case where the data received in a given time period is always output at the end of that time period. In such an embodiment, the data buffer 902 needs to be larger than in the case where there is no sharing between data rate measurement time periods in order to accommodate the data to be shared. The actual buffer size depends in part on how much variation, e.g., data sharing, is to be allowed between data rate measurement time periods.

One way to make the data buffer 902 act as a data rate smoother is to apply a linear low pass filter to the received data such that RO(t)=LPF(RP(t)). In such a case, the buffer control circuit 901 operates to smooth the data buffer output rate over a period equal to the data rate measurement period T. By smoothing the data output rate of the buffer 902 over the period T, the amount of data reduction which must be performed by the data reduction/padding circuit 904 will be reduced.

Another method of implementing a data smoothing operation is to perform a data rate smoothing operation over multiple data rate measurement periods T by controlling the output rate RO of the data buffer 902 so that the data buffer 902 operates as a non-linear filter with regard to the output data rate. One way to do this is to allow carryover of underflow between data rate measurement periods, within the buffer limits, but not to allow carryover of overflow. In such a case, the carryover in bits, CO(t), at time t will always be less than or equal to zero. In this embodiment, where the data buffer 902 is operated to operate as a non-linear data filter, the minimum size of the data buffer 902 is the maximum number of bits that can be received in the preselected data rate measurement time period ($R_{max}*T$) plus the maximum permitted number of carryover bits $CO_{max}$.

The operation of the data buffer 902 as a non-linear filter in an embodiment where the data buffer 902 is emptied at a variable rate, and the operation of the data reduction circuit 904, under the control of the buffer control circuit 901, during steady state operation, is described in the pseudo code set forth below:

---

Begin
    if CO(t) + RP(t) > RR then
        set RO(t) = RP(t);

```
            perform data rate reduction to data rate RR; and
            set CO(t + 1) = CO(t);
    end if;
    if CO(t) + RP(t) <= RR then
            set RO(t) = RR (no data reduction is needed) and
            if data buffer is empty then
                    set CO(t + 1) = CO(t) + RP(t) − RR
            end if;
    end if;
Repeat from begin.
```

The operation of the data reduction circuit 904 and the data buffer 902, in an embodiment where the buffer 902 is emptied at a known fixed rate and where data is input to the buffer at an unknown rate corresponding to the rate of the received signal, is described by the pseudo code set forth below:

```
Begin
    Load buffer so that B = (RR − RI_min)*T;
    set t = 1
    set RO(1) = RR;
    measure buffer input data rate over one data rate time
            measurement period T and set RI(1) = measured
            input data rate
    for each interval T do:
            set t = t + 1;
            measure the data buffer input data rate and set
                    RI(t) = the measured input data rate;
            set RO(t) = RI(t − 1);
            if RO(t) > RR then
                    perform data reduction to reduce the rate of
                    the data output by the data reduction circuit
                    to RR;
                    else if RO(t) = RR then
                            perform no data reduction;
                            else if RO(t) < RR then
                                    perform data padding so that the
                                    output rate of the data reduction
                                    circuit = RR;
                            end else if;
                    end else if;
            end if;
    end do;
End.
```

The above pseudo code describes the case where the data is removed from the data buffer 902 at a known rate while data is simultaneously input to the buffer at an unknown rate which is measured over the data rate measurement period T.

In this embodiment, the initial output rate, RO(1), is set equal to the recording rate RR and the initial buffer fullness, B, is set to equal $(RR-RI_{min})*T$. Over each data rate measurement time period T, the input rate, RI, is measured. In the subsequent data rate measurement time periods the data buffer data output rate RO(t) is set equal the measured input rate of the preceding time period RI(t−1).

In such a case, buffer fullness is equal to the previous buffer data level plus the difference between the previous buffer level and the difference between the input and output data rates, i.e. B(t)=B(t−1)+RI(t)−RO(t). It can be shown that the maximum buffer size required to support this embodiment is equal to the difference between the maximum input rate and the minimum input rate times the measurement period, $B_{max}=(RI_{max}-RI_{min})*T$.

For such an embodiment, assuming, for example, an input rate which ranges between 8 and 12 MBs and a measurement duration corresponding to a 15 frame GOP where each frame has a 1/30 second display time, the buffer size required would be, e.g., 2 Mbits. The reduction rate for the bitstream would be the amount by which RO(t) exceeds the recording rate and padding would be employed when RO is less than the recording rate.

As discussed above, rather than making the output rate of the data buffer 902 simply a delayed version of the input rate, it can be a smoothed, e.g., low pass filtered version of the input data rate. Such smoothing is likely to reduce the amount of data reduction necessary if the input rate varies quickly with respect to the LPF time constant used for data rate filtering. However, it should be noted that buffering proportional to the time constant of the LPF is required with an increase in the LFP time constant requiring a larger filter. The maximum buffer size required will be the difference between the $RI_{max}$ and $RI_{min}$ times the time constant of the LPF. This is similar to allowing a long time between measurements of the input rate.

Many of the various methods described above of converting a variable rate bit stream into a fixed rate bitstream involve reducing the amount of data used to represent a video frame. To enhance the picture quality of a received reduced rate bitstream, a decoder may be designed to perform various types of processing operation on the reduced rate data to improve picture quality. Information regarding the amount of data reduction performed on video frames may be useful to such a post processor, e.g., to enable it to determine what type of video processing operation will provide the best results in overall picture quality.

In order to facilitate such processing operations upon decoding, the data reduction/padding circuit 904, in one embodiment of the present invention, incorporates header information into the video data stream associated with video frames upon which data reduction operations have been performed. The headers indicate, e.g., the amount of data reduction performed on the video frame data and/or the change in the quantization level used to encode the video frames from the quantization level that was used to encode the video frames before requantization was used to reduce the amount of data in the video frame.

While the recording methods of the present invention have been generally described assuming that an HDTV signal will be a signal having a fixed data rate it is to be understood that the present invention is not so limited. In fact, the recording and data rate smoothing techniques of the present invention are readily applicable to the recording of fixed and variable data rate HDTV, SDTV signals as well as other types of fixed and variable rate digital data bitstreams.

What is claimed is:

1. A method of processing a first set of quantized video data representing a picture to produce therefrom a second set of quantized video data representing the picture, the method comprising the steps of:

performing an inverse quantization operation on the first set of quantized video data to generate a set of dequantized picture data including discrete cosine transform coefficients; and requantizing at least a portion of the set of dequantized picture data, using a higher quantization scale factor when performing requantization on data representing a first portion of the picture than is used when performing requantization on data representing other portions of the picture, said portion of the set of dequantized picture data that is requantized including at least some of said discrete cosine transform coefficients.

2. The method of claim 1, wherein the first portion of the picture is the outer peripheral portion of the picture corresponding to approximately the outer 25% of the picture.

3. A method of processing a first set of quantized video data representing an image to produce therefrom a second set of quantized video data representing the image, the method comprising the steps of:

performing an inverse quantization operation on the first set of quantized video data to generate a set of dequantized image data;

adding a pseudo random dither pattern to at least a portion of the dequantized image data;

requantizing said portion of the set of dequantized image data to which a pseudo random dither pattern was added, the step of requantizing including the step of using a higher quantization scale factor when performing requantization on data representing a first portion of the image, than is used when performing requantization on data representing other portions of the image.

4. The method of claim 2, further comprising the step of:

adding a pseudo random dither pattern to the dequantized picture data prior to performing requantization.

5. The method of claim 1, wherein the first portion of the picture is an outer peripheral portion of the picture.

* * * * *